(12) United States Patent
Son et al.

(10) Patent No.: US 12,493,764 B2
(45) Date of Patent: Dec. 9, 2025

(54) TRAY FOR ACCOMMODATING EXTERNAL STORAGE MEDIUM AND ELECTRONIC DEVICE INCLUDING THE SAME

(71) Applicant: Samsung Electronics Co., Ltd., Suwon-si (KR)

(72) Inventors: Kwonho Son, Suwon-si (KR); Heecheul Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 18/070,995

(22) Filed: Nov. 29, 2022

(65) Prior Publication Data

US 2023/0306219 A1   Sep. 28, 2023

Related U.S. Application Data

(63) Continuation of application No. PCT/KR2022/018288, filed on Nov. 18, 2022.

(30) Foreign Application Priority Data

Mar. 24, 2022   (KR) .................. 10-2022-0036581
May 18, 2022   (KR) .................. 10-2022-0061121

(51) Int. Cl.
  *G06K 13/103*   (2006.01)
  *G06K 13/08*    (2006.01)
(52) U.S. Cl.
  CPC ....... *G06K 13/103* (2013.01); *G06K 13/0831* (2013.01)
(58) Field of Classification Search
  CPC ....... G06K 13/103; G06K 13/08–0893; H01R 13/635; H01R 13/629–62994

USPC ......................................................... 439/159
  See application file for complete search history.

(56) References Cited

U.S. PATENT DOCUMENTS

| | | | | |
|---|---|---|---|---|
| 5,281,157 A | * | 1/1994 | Abe | ............ G06K 7/0069 |
| | | | | 439/911 |
| 6,089,891 A | * | 7/2000 | Nishioka | ........... G06K 13/08 |
| | | | | 439/159 |
| 7,766,678 B1 | | 8/2010 | Abe | |
| 8,591,240 B2 | | 11/2013 | Jenks | |

(Continued)

FOREIGN PATENT DOCUMENTS

| | | |
|---|---|---|
| CN | 107732490 A | 2/2018 |
| CN | 107809019 A | 3/2018 |

(Continued)

OTHER PUBLICATIONS

Extended European Search Report dated Jan. 17, 2025, issued in European Application No. 22933777.9.

(Continued)

*Primary Examiner* — Christopher M Koehler
*Assistant Examiner* — Gregory L Mangot
(74) *Attorney, Agent, or Firm* — Jefferson IP Law, LLP

(57) ABSTRACT

An electronic device an embodiment of the disclosure comprises a housing including an opening in a side thereof; a tray including a tray body, a lever assembly arranged to have a rotation axis fixed to the tray body, and a tray head arranged to be coupled to the lever assembly to be movable with respect to the rotation axis; and a socket arranged in the housing to receive at least a portion of the tray drawn-in into the opening in the housing.

20 Claims, 36 Drawing Sheets

(56) References Cited

U.S. PATENT DOCUMENTS

| | | | |
|---|---|---|---|
| 9,213,921 B2 | 12/2015 | Lei et al. | |
| 9,622,364 B2 | 4/2017 | Baek et al. | |
| 9,680,243 B2 | 6/2017 | Shimotsu et al. | |
| 9,954,328 B2 | 4/2018 | Motohashi et al. | |
| 10,317,956 B2 | 6/2019 | Kim et al. | |
| 10,651,600 B1 * | 5/2020 | Lin | G06K 13/08 |
| 2005/0136712 A1 * | 6/2005 | Katayanagi | G06K 7/0043 |
| | | | 439/139 |
| 2012/0134119 A1 * | 5/2012 | Tang | G06K 13/0825 |
| | | | 361/748 |
| 2020/0060031 A1 * | 2/2020 | Zeng | G06K 13/0825 |

FOREIGN PATENT DOCUMENTS

| | | |
|---|---|---|
| CN | 107171089 B | 5/2019 |
| CN | 107257246 B | 11/2020 |
| CN | 112688101 B | 2/2022 |
| CN | 114125110 A | 3/2022 |
| JP | 1998-255905 A | 9/1998 |
| JP | 2000-077134 A | 3/2000 |
| JP | 2012-174677 A | 9/2012 |
| JP | 5880853 B2 | 3/2016 |
| JP | 2017-142968 A | 8/2017 |
| KR | 10-2014-0127079 A | 11/2014 |
| KR | 10-2015-0099346 A | 8/2015 |
| KR | 10-2016-0016625 A | 2/2016 |
| KR | 10-2016-0090738 A | 8/2016 |
| KR | 10-2017-0042148 A | 4/2017 |

OTHER PUBLICATIONS

International Search Report dated Feb. 27, 2023, issued in International Patent Application No. PCT/KR2022/018288.
Korean Office Action dated Oct. 21, 2025, issued in a Korean Patent Application No. 10-2022-0061121.

* cited by examiner

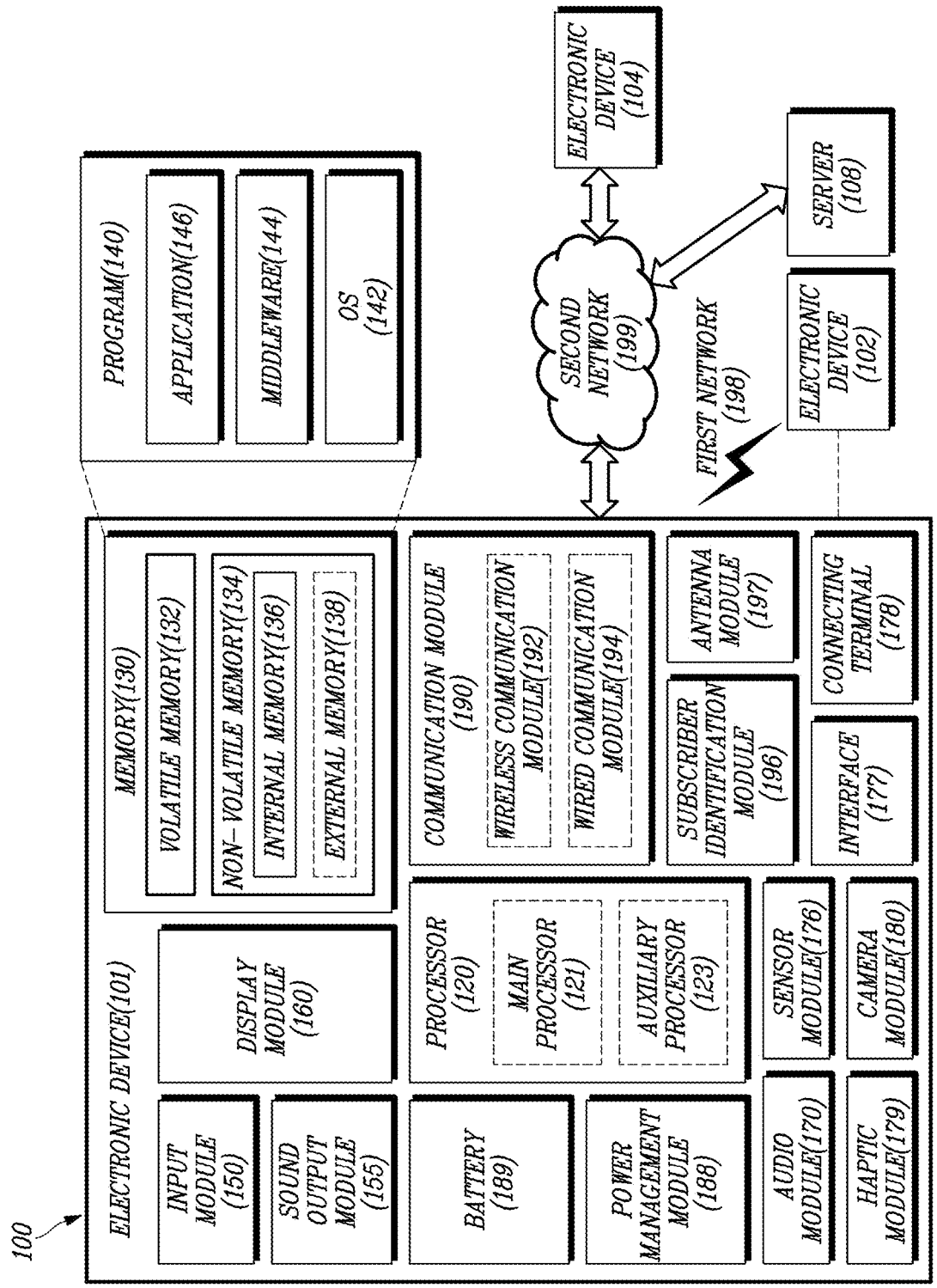

<A − A'>

<B − B'>

<C – C'>

<D - D'>

TRAY FOR ACCOMMODATING EXTERNAL STORAGE MEDIUM AND ELECTRONIC DEVICE INCLUDING THE SAME

CROSS REFERENCE TO RELATED APPLICATION(S)

This application is a continuation application, claiming priority under § 365(c), of an International application No. PCT/KR2022/018288, filed on Nov. 18, 2022, which is based on and claims priority of a Korean patent application number 10-2022-0036581, filed on Mar. 24, 2022, in the Korean Intellectual Property Office, and of a Korean patent application number 10-2022-0061121, filed on May 18, 2022, in the Korean Intellectual Property Office, the disclosure of each of which is incorporated by reference herein in its entirety.

BACKGROUND

1. Field

The disclosure relates to a tray for accommodating an external storage medium and an electronic device including the same.

2. Description of Related Art

An external storage medium (e.g., a memory card) may be mounted onto an electronic device using a tray (or an adapter). The tray may be a device for electrically or mechanically connecting such an external storage medium to a socket (or a connector) of an electronic device. The external storage medium may be detachably attached to the tray. The tray with the external storage medium may be inserted into a socket hole (or a connector hole) formed in a housing of the electronic device, and the external storage medium may be electrically connected to the socket located in the housing corresponding to the connector hole.

A typical tray may be removed by a user pressing a lever arranged in a socket using an external member (e.g., an eject pin).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that enables simplification of structure by removing a lever from a socket (or a connector).

Additional aspects will be set forth in part in the description which follows and, in part, will be apparent from the description, or may be learned by practice of the presented embodiments.

An electronic device according to an embodiment of the disclosure may comprise a housing including an opening in a side thereof; a tray including a tray body, a lever assembly arranged to have a rotation axis fixed to the tray body, and a tray head arranged to be coupled to the lever assembly to be movable with respect to the rotation axis; and a socket arranged in the housing to receive at least a portion of the tray introduced into the opening in the housing.

A tray mounted on an electronic device according to an embodiment of the disclosure may comprise a tray body configured to accommodate an external storage medium; a lever assembly configured so that the rotation axis is fixed to the tray body; and a tray head configured to be coupled to the lever assembly to be movable with respect to the rotation axis.

According to various embodiments proposed in the disclosure, the tray can simplify the socket structure by means of configuring the lever assembly in a portion of the tray.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an example configuration of an electronic device in a network environment according to various embodiments of the disclosure;

The same reference numerals are used to represent the same elements throughout the drawings.

DETAILED DESCRIPTION

Figure 2A:
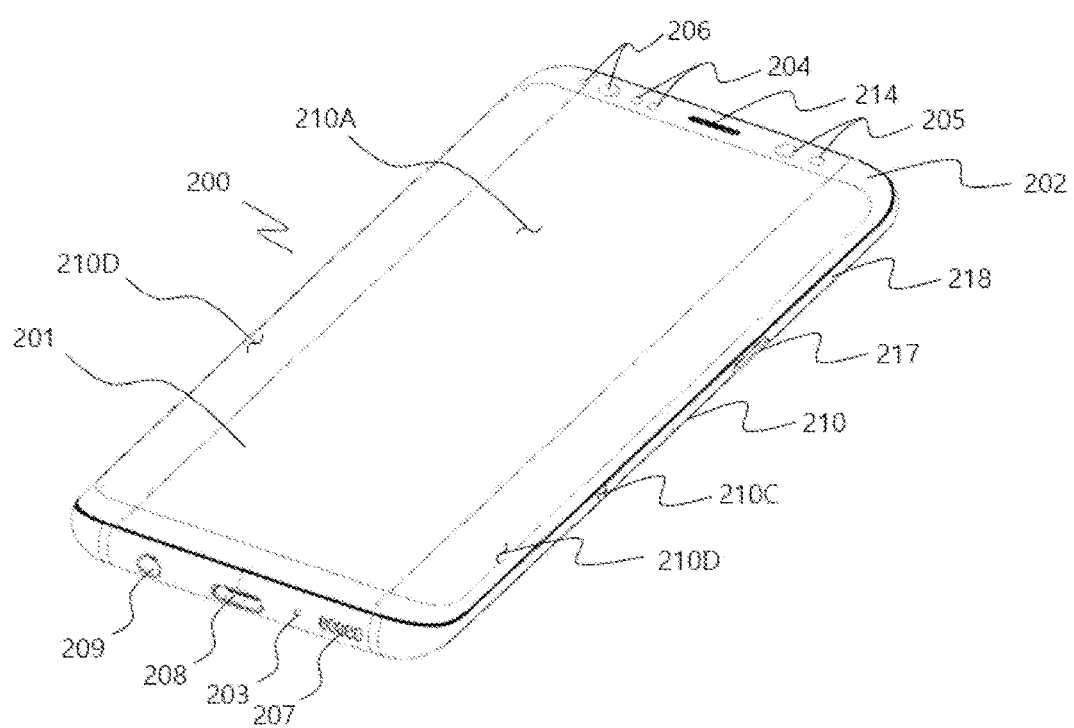
FIG. 2A is a perspective view illustrating a front surface of a mobile electronic device according to an embodiment.

Hereinafter, with reference to the drawings, various embodiments of the disclosure will be described in detail so that those having ordinary knowledge in the technical field to which the disclosure pertains can easily implement the disclosed invention. However, the disclosure may be implemented in several different forms and is not limited to the embodiments described herein. In conjunction with the description of the drawings, like or similar reference numerals may be used for such like or similar components. Further, in the drawings and their related descriptions, descriptions of well-known functions and configurations may be omitted for clarity and conciseness.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processinG. The artificial intelligence model may be generated via machine learninG. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed in this document may have various types of devices. The electronic device may include, for example, a portable communication device (e.g., a smailphone), a computer device, a portable multimedia device, a portable medical device, a camera, a wearable device, or a home appliance device. The electronic device according to the embodiments of the disclosure is not limited to those devices described above.

FIG. 2A is a perspective view illustrating a front surface of a mobile electronic device according to an embodiment.

Figure 2B:
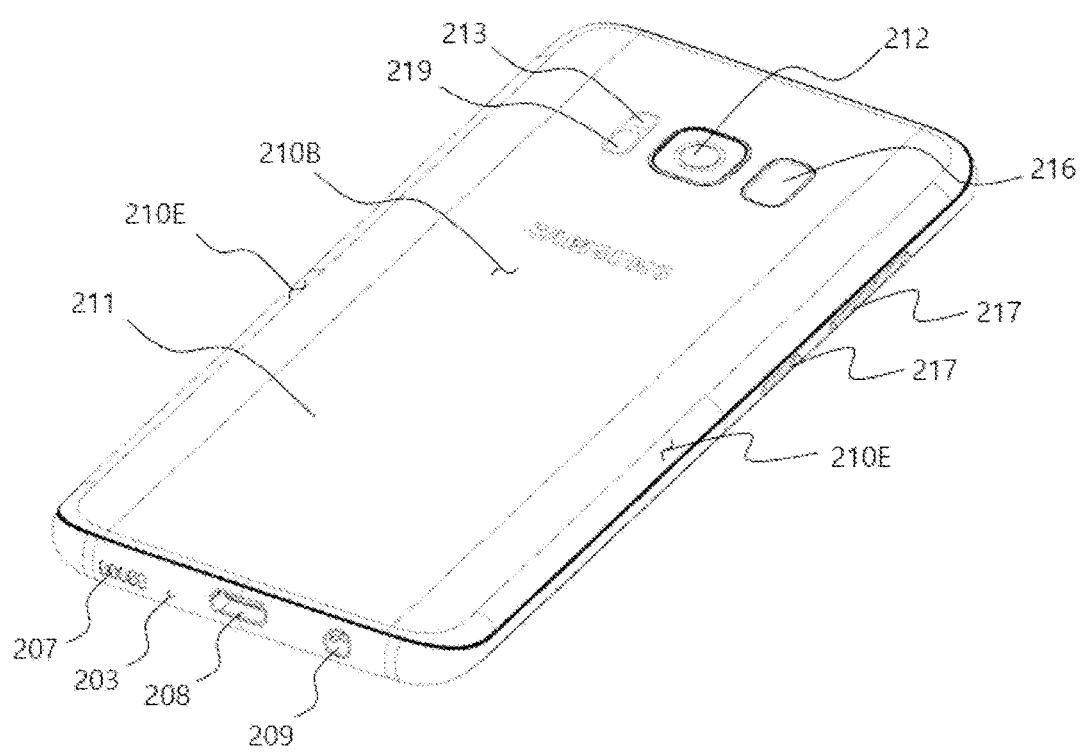
FIG. 2B is a perspective view illustrating a rear surface of an electronic device of FIG. 2A.

FIG. 2B is a perspective view illustrating a rear surface of an electronic device of FIG. 2A.

Referring to FIGS. 2A and 2B, an electronic device 200 according to an embodiment may include a housing having a first surface (or front side) 210A, a second surface (or back side) 210B, and a side surface 210C surrounding a space between the first surface 210A and the second surface 210B. In another embodiment (not shown), the housing may refer to a structure forming at least a portion of the first surface 210A, the second surface 210B, and the side surface 210C of FIG. 1. According to an embodiment, the first surface 210A may be formed by a front plate 202 (e.g., a glass plate or a polymer plate including various coating layers), which is at least partially transparent. The second surface 210B may be formed by a substantially opaque back plate 211. The back plate 211 may be formed of, for example, coated or colored glass, ceramic, polymer, metal (e.g., aluminum, stainless steel (STS), or magnesium), or a combination of at least two of these materials. The side surface 210C may be coupled to the front plate 202 and the back plate 211 and may be formed by a side bezel structure (or "side member") 218 including metal and/or polymer. In some embodiments, the back plate 211 and the side bezel structure 218 may be integrally formed and include the same material (e.g., a metal material such as e.g., aluminum).

In the embodiment illustrated above, the front plate 202 may have two first regions 210D that extend seamlessly bending from the first surface 210A toward the back plate 211, at both ends of a long edge of the front plate 202. In the illustrated embodiment (see FIGS. 2A and 2B), the back plate 211 may have two second regions 210E that extend seamlessly bending from the second surface 210B toward the front plate 202, at both ends of a long edge thereof. In some embodiments, the front plate 202 (or the back plate 211) may only include either one of the first regions 210D (or the second regions 210E). In another embodiment, it may not include at least a portion of the first regions 210D or the second regions 210E. In these embodiments, when viewed from a side of the electronic device 200, the side bezel structure 218 may have a first thickness (or width) at a side that does not include the first regions 210D or the second regions 210E, or may have a second thickness (width), which is thinner than the first thickness (width), at a side including the first regions 210D or the second regions 210E.

According to an embodiment, the electronic device 200 may include a display 201, an audio module 203, 207 and 214, a sensor module 204, 216 and 219, and a camera module 205, 212 and 213, a key input device 217, a light emitting device 206 and at least one of connector holes 208 and 209. In some embodiments, the electronic device 200 may omit at least one of those components (e.g., the key input device 217 or the light emitting device 206) or additionally include other components.

The display 201 may be configured to be exposed through a substantially most area of the front plate 202, for example. In some embodiments, at least a portion of the display 201 may be exposed through the front plate 202 forming the first surface 210A and the first region 210D of the side surface 210C. In some embodiments, the edges of the display 201 may be formed to be substantially the same as an adjacent outer shape of the front plate 202. In another embodiment (not shown), in order to expand the area through which the display 201 is exposed, a distance between an outer edge of the display 201 and an outer edge of the front plate 202 may be formed substantially the same as each other.

In another embodiment (not shown), a recess or opening may be formed in a portion of a screen display area of the display 201, and at least one of an audio module 214, the sensor module 204, the camera module 205 or the light emitting device 206 may be arranged therein in alignment with the recess or the opening. In another embodiment (not shown), at least one of the audio module 214, the sensor module 204, the camera module 205, a fingerprint sensor (i.e., fourth sensor module 216), or the light emitting device 206 may be arranged in a back surface of the screen display area of the display 201. In another embodiment (not shown), the display 201 may be coupled to or arranged adjacent to at least one of a touch sensing circuit, a pressure sensor for measuring intensity (pressure) of a touch, or a digitizer for detecting a magnetic-field type stylus pen. In some embodiments, at least a portion of the sensor module 204 and 219 and/or at least a portion of the key input device 217 may be disposed in at least one of the first region 210D or the second region 210E.

The audio module 203, 207 and 214 may include a microphone hole 203 and speaker holes 207 and 214. In the microphone hole 203 may be disposed a microphone for acquiring external sound, and in some embodiments, a plurality of microphones may be disposed to detect a direction of the sound. The speaker holes 207 and 214 may include an external speaker hole 207 and a receiver hole 214 for a phone call. In some embodiments, the speaker holes 207 and 214 and the microphone hole 203 may be implemented as a single hole, or a speaker (e.g., a piezo speaker) may be implemented without any speaker holes 207 and 214.

The sensor modules 204, 216 and 219 may generate an electrical signal or data values corresponding to an internal operating state of the electronic device 200 or an external environmental condition. The sensor modules 204, 216 and 219 may include, for example, a first sensor module 204 (e.g., proximity sensor) and/or a second sensor module (not shown) (e.g., fingerprint sensor), and/or a third sensor module 219 (e.g., heart rate monitor (HRM) sensor) and/or a fourth sensor module 216 (e.g., fingerprint sensor), being disposed on the second surface 210B of the housing 210. The fingerprint sensor may be disposed on the second surface 210B as well as the first surface 210A (e.g., the display 201) of the housing 210. The electronic device 200 may further include a sensor module (not shown), for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor or an illuminance sensor 204.

The camera modules 205, 212 and 213 may include a first camera device 205 disposed on the first surface 210A of the electronic device 200, and a second camera module 212 disposed on the second surface 210B of the electronic device 200, and/or a flash 213. The camera devices (i.e., camera module 205 and 212) may include one or more lenses, an image sensor, and/or an image signal processor, respectively. The flash 213 may include, for example, a light emitting diode or a xenon lamp. In some embodiments, the two or more lenses (infrared cameras, wide angle and telephoto lens) and image sensors may be disposed on one surface of the electronic device 200.

The key input device 217 may be disposed on one side surface 210C of the housing 210. In another embodiment, the electronic device 200 may not include some or all of the key input devices 217, and the remaining key input devices 217 not included therein may be implemented on the display 201 in a different type of key such as a soft key, etc. In some embodiments, the key input device may further include a sensor module 216 disposed on the second surface 210B of the housing 210.

The light emitting device 206 may be disposed on the first surface 210A of the housing 210, for example. The light emitting device 206 may provide, for example, state information of the electronic device 200 in the form of light. In another embodiment, the light emitting device 206 may provide, for example, a light source associated with an operation of the camera module 205. The light emitting device 206 may include, for example, light emitting diodes (LEDs), IR LEDs, and xenon lamps.

The connector holes 208 and 209 may include a first connector hole 208 for accommodating a connector (e.g., USB connector) for use in transmitting and receiving power and/or data with an external electronic device, and/or a second connector hole 209 (e.g., earphone jack) for accommodating a connector for transmitting and receiving an audio signal to and from an external electronic device.

Figure 3:
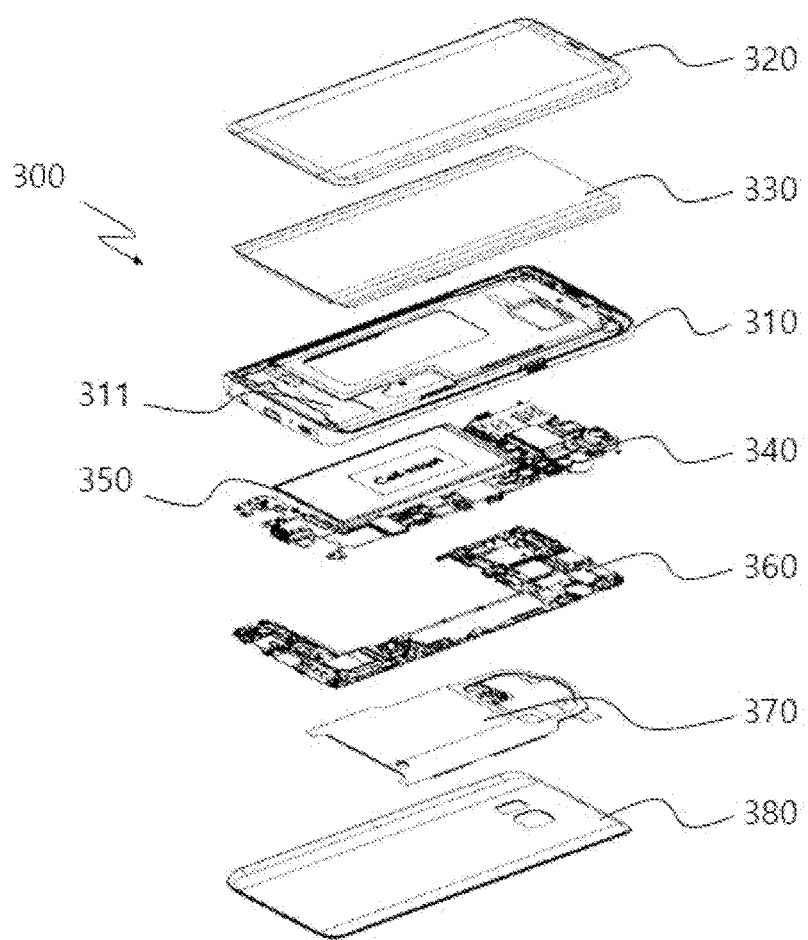
FIG. 3 is an exploded perspective view of an electronic device of FIG. 2A.

FIG. 3 is an exploded perspective view of an electronic device of FIG. 2A according to an embodiment of the disclosure.

Referring then to FIG. 3, an electronic device 300 may include a side bezel structure 310, a first support member 311 (e.g., bracket), a front plate 320, a display 330, and a printed circuit board 340, a battery 350, a second support member 360 (e.g., rear case), an antenna 370, and a rear plate 380. In some embodiments, the electronic device 300 may omit at least one of these components (e.g., the first support member 311 or the second support member 360) or additionally include other components. At least one of the components of the electronic device 300 may be the same as or similar to at least one of the components of the electronic device 101 of FIG. 1 or 2A, and any overlapping descriptions thereof will be omitted, hereinafter.

The first support member 311 may be disposed inside the electronic device 300 to be connected to the side bezel structure 310, or may be integrally formed with the side bezel structure 310. The first support member 311 may be formed of, for example, a metal material and/or a non-metal (e.g., polymer) material. The first support member 311 may be coupled at one side to the display 330 and coupled at the other side to the printed circuit board 340. The printed circuit board 340 may be equipped with at least one of a processor, a memory, or an interface. The processor may include, for example, one or more of a central processing unit, an application processor, a graphics processing unit, an image signal processor, a sensor hub processor, a communication processor or the like.

The memory may include, for example, a volatile memory or a non-volatile memory.

The interface may include, for example, a high definition multimedia interface (HDMI), a universal serial bus (USB) interface, an SD card interface, and/or an audio interface.

The interface may be configured to, for example, electrically or physically connect the electronic device 300 to an external electronic device, and may include a USB connector, an SD card/multimedia card (MMC) connector, or an audio connector.

The battery 350, which is a device for supplying power to at least one component of the electronic device 300, may include, for example, a non-rechargeable primary cell, or a rechargeable secondary cell, or a fuel cell. At least a portion of the battery 350 may be disposed, for instance, substantially on the same plane as the printed circuit board 340. The battery 350 may be integrally installed inside the electronic device 300, or may be disposed detachably from the electronic device 300.

The antenna 370 may be disposed between the rear plate 380 and the battery 350. The antenna 370 may include, for example, a near-field communication (NFC) antenna, a wireless charging antenna, and/or a magnetic secure transmission (MST) antenna. The antenna 370 may, for example, perform short-range communication with any external device or wirelessly transmit/receive power required for charging. In another embodiment, the antenna structure may be formed by at least one of a part of the side bezel structure 310 or the first support member 311.

Figure 4:
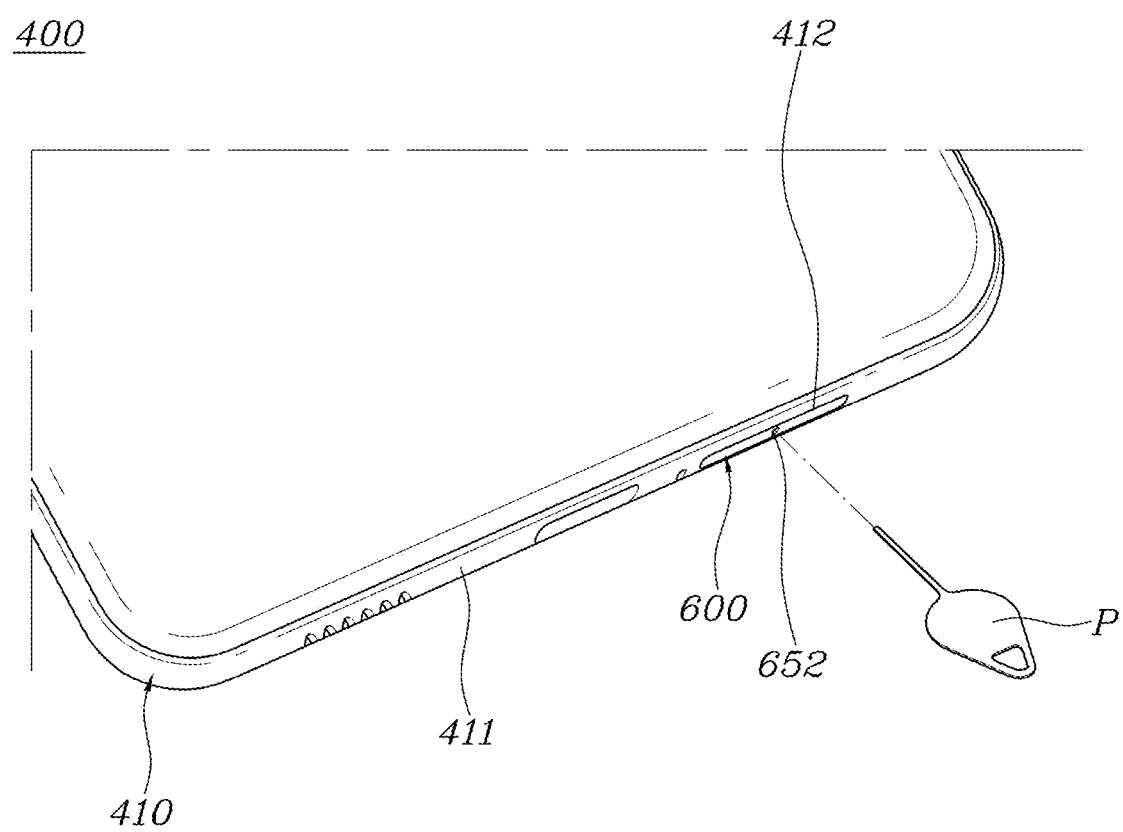
FIGS. 4 and 5 are views illustrating an example process of removing a tray of an electronic device according to an embodiment.
Figure 5:
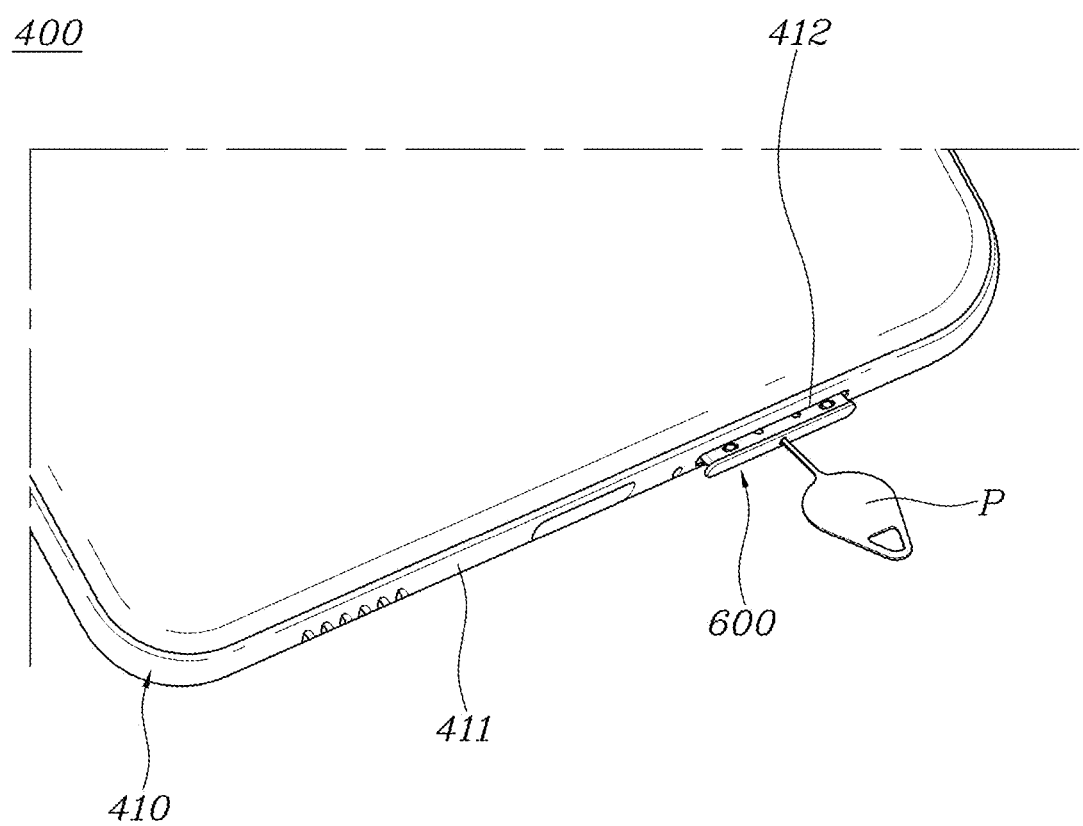

FIGS. 4 and 5 are views illustrating a process of removing a tray of an electronic device according to various embodiments of the disclosure. FIG. 5 shows a perspective view illustrating a situation that an external member (e.g., an eject pin P) is inserted into an eject hole 652 to take out the tray to the outside.

Referring to FIGS. 4 and 5, an electronic device 400 according to various embodiments may include a tray 600.

According to an embodiment, the tray 600 may include a receiving section (e.g., a receiving section 611 of FIG. 8) for accommodating an external storage medium, and may be detachably coupled to one of the sides of the housing 410 (e.g., a lower side 411). An opening 412 may be formed in the housing 410 so that the tray 600 can be inserted thereto or detached therefrom. The opening 412 may be formed, for example, to correspond to the shape of a tray head (e.g., a tray head 650 of FIG. 6).

The tray 600 may be detachably coupled to the lower side 411 of the side surfaces of the electronic device 400. When the tray 600 is mounted on the electronic device 400, an outer surface of the tray 600 (e.g., a front portion 650c of the tray head 650 in FIG. 7) may have a flat or curved profile corresponding to one surface of the lower side 411, so as to form a seamless outer surface integrated with the exterior of the electronic device 400 together with the lower side 411. The external storage medium may include a memory card such as e.g., a secure digital card (SD card) or a micro SD card, or a subscriber identity module card (SIM card), but it is not limited thereto.

In order to remove the tray 600 mounted in the lower side 411 of the housing 410, an eject pin P may be inserted into the eject hole 652. The eject pin P may include a rod having a shape corresponding to the shape of the eject hole 652, and may include a grip for gripping by a user, but it is not limited thereto. Further, it may have various structures capable of being inserted into the eject hole 652, such as for example, a clip or a pen. As shown in FIG. 5, when the user applies force with inserting the eject pin P into the eject hole 652, the tray 600 may be at least partially separated from the opening 412 and be pulled-out out of the housing 410. For example, at least a portion of the tray head (e.g., the tray head 650 of FIG. 6) may be drawn out to protrude out of the opening 412.

The electronic device according to various embodiments disclosed in the disclosure may be various types of devices. For example, the electronic device may include a mobile communication device (e.g., a smailphone), a computer, a portable multimedia device, a portable medical device, a camera, a wearable device, or a home appliance device. The electronic device according to the embodiments of the disclosure is not limited to the above-described devices.

Although FIGS. 4 and 5 above illustrate the tray 600 for use in a mobile communication device (e.g., a smailphone), it is merely of an example, and such a tray 600 according to various embodiments described below may be applied to any electronic device with which an external storage medium may be used, such as e.g., a computer device, a portable multimedia device, a portable medical device, a camera, a wearable device, an electronic organizer, a tablet PC, video/audio devices, a vehicle navigation device or a home appliance device, but the disclosure not limited thereto.

Figure 6:
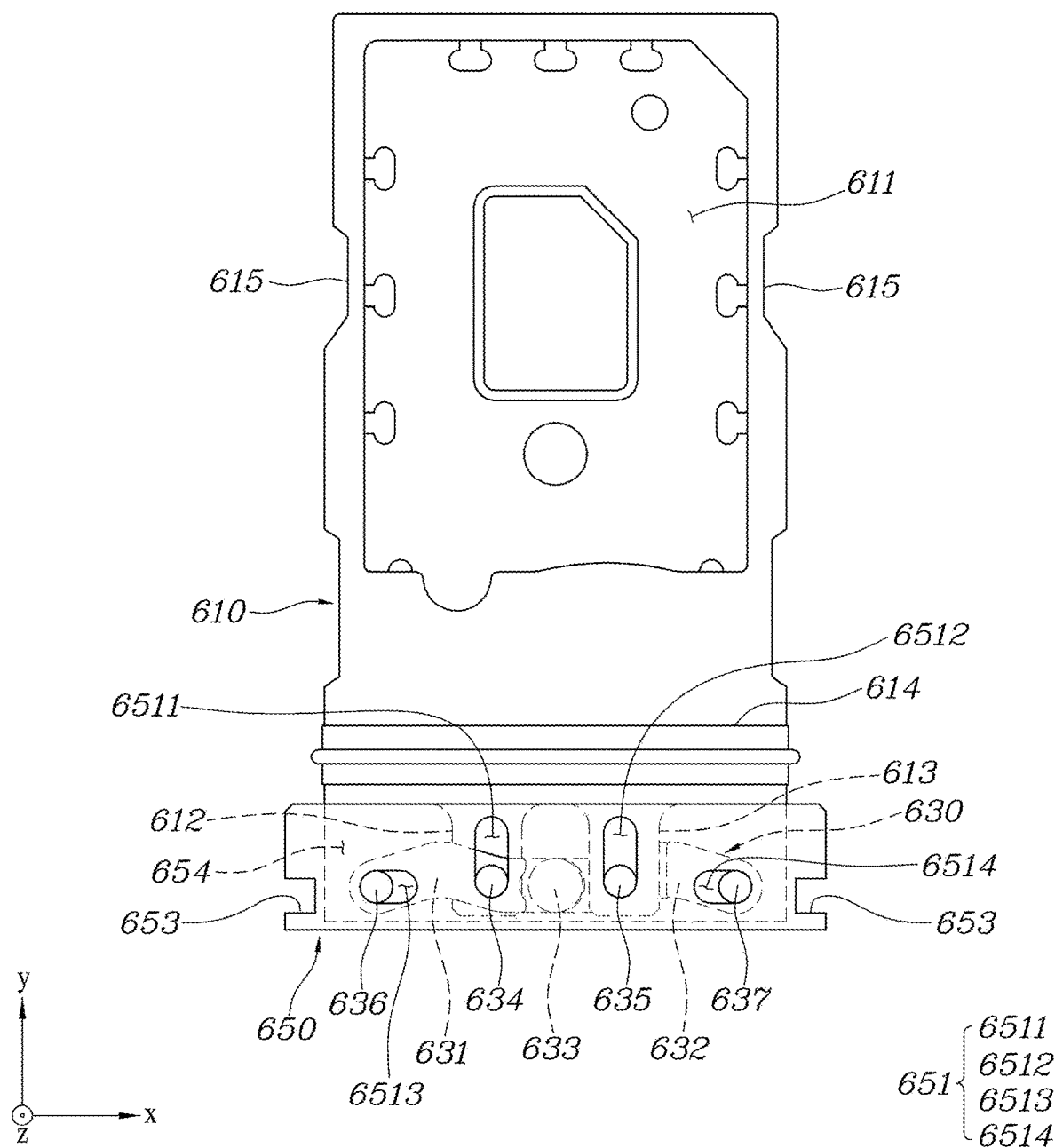
FIG. 6 is a plan view of a tray according to various embodiments.

FIG. 6 is a plan view of the tray according to an embodiment of the disclosure.

Figure 7:
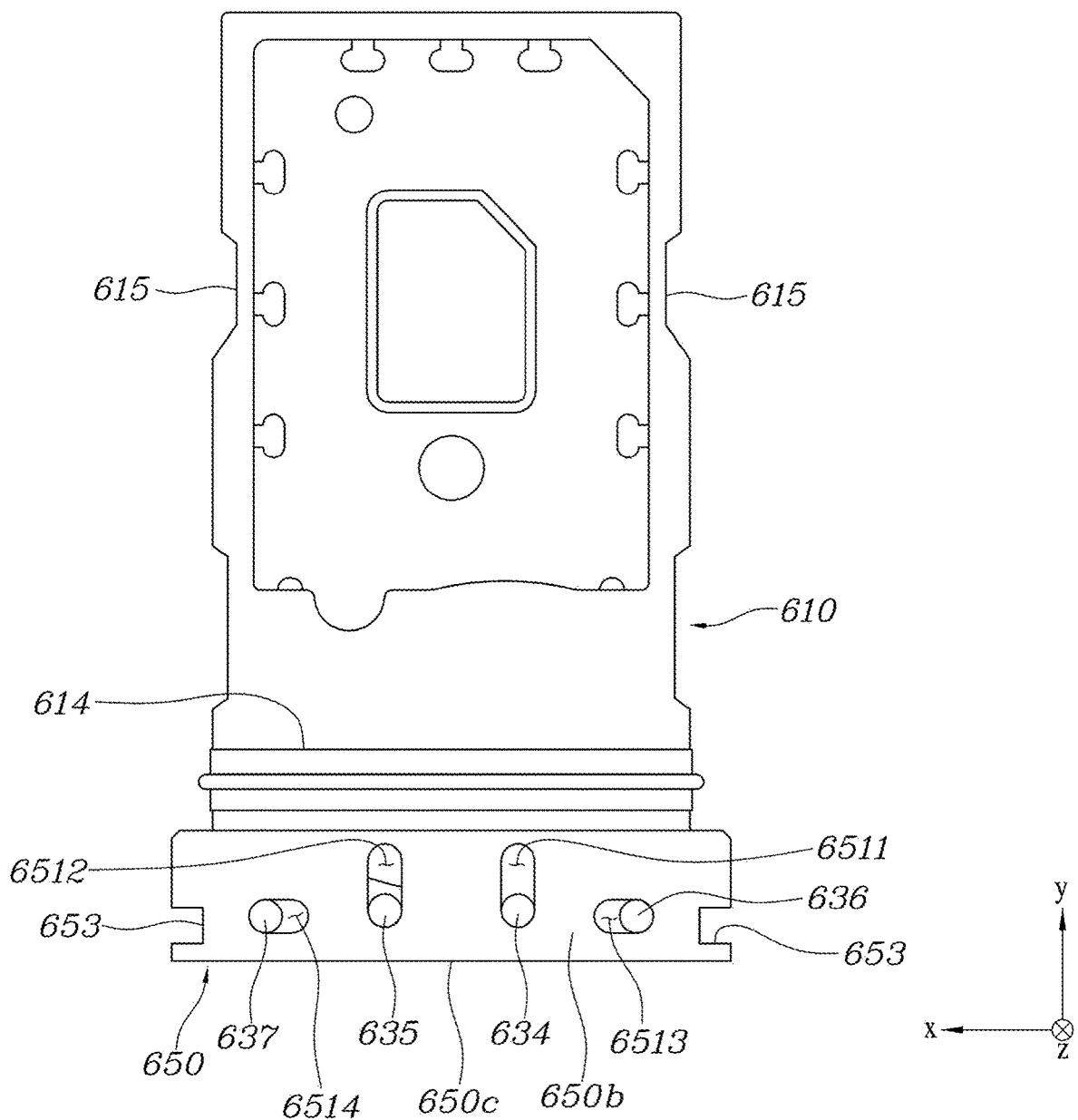
FIG. 7 is a rear view of the tray of FIG. 6.

FIG. 7 is a rear view of the tray of FIG. 6.

Figure 8:
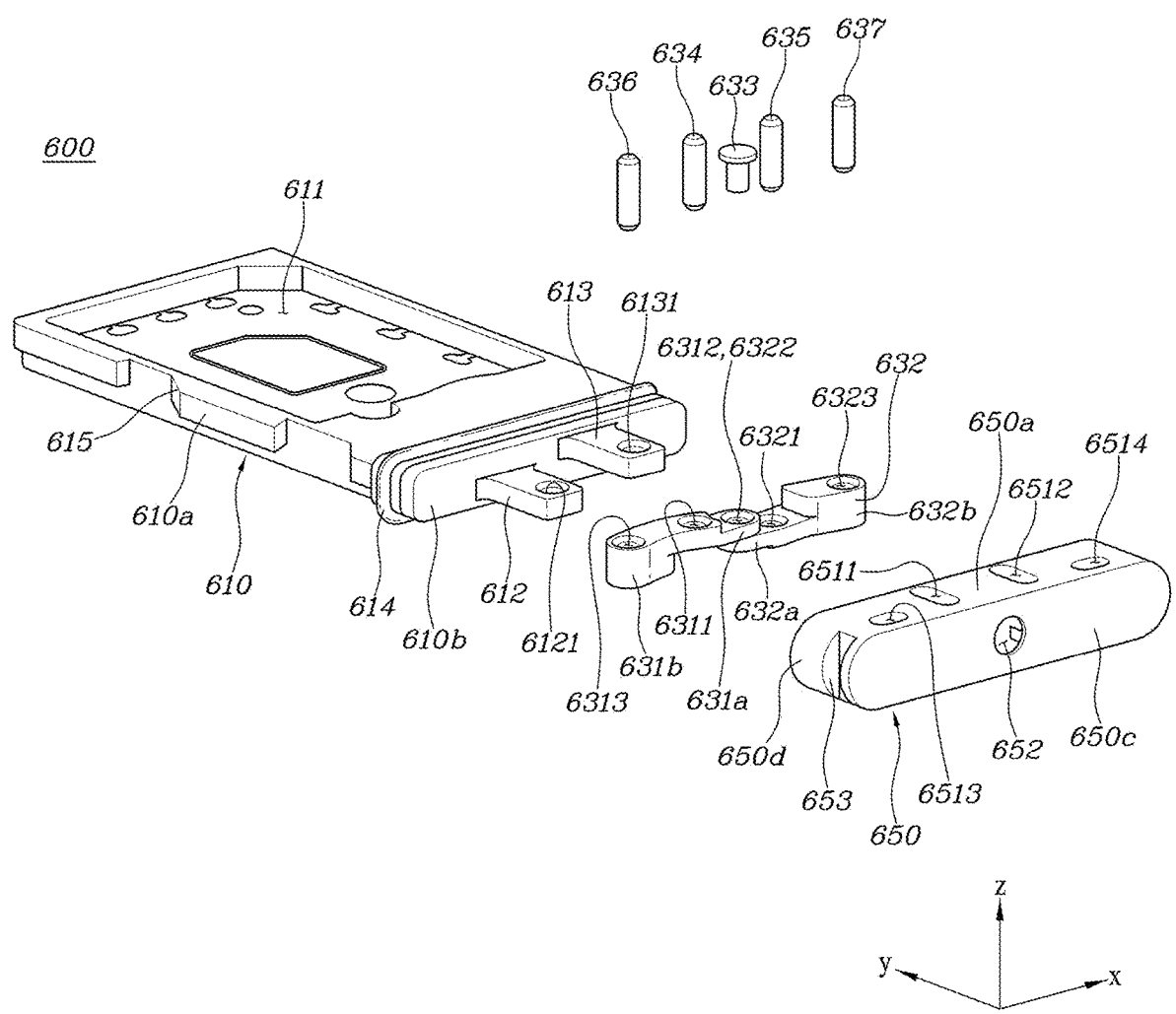
FIG. 8 is an exploded perspective view of the tray of FIG. 6.

FIG. 8 is an exploded perspective view of the tray of FIG. 6.

Figure 35:
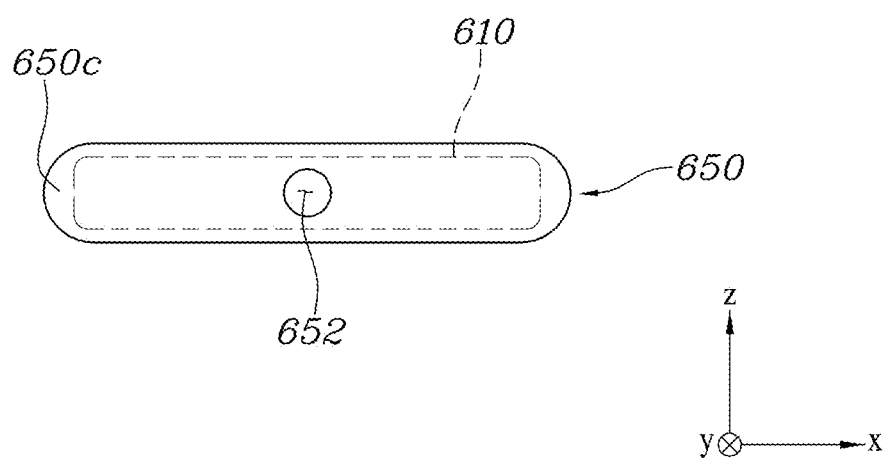
FIG. 35 is a front view of the tray of FIG. 6.

And FIG. 35 is a front view of the tray of FIG. 6.

Referring to FIGS. 6, 7, 8 and 35, the tray 600 according to various embodiments may include a tray body 610, a lever assembly 630 and a tray head 650. The tray 600 may be inserted into a side (e.g., the side 411 of FIG. 4) of a housing (e.g., the housing 410 of FIG. 4) of an electronic device (e.g., the electronic device 400 of FIG. 4). More specifically, the tray 600 may be configured to hold the external storage medium to be mounted onto a socket (e.g., a socket 2000 of FIG. 20) in the housing 410, in which the external storage medium may be in electrical contact with a portion of the socket (e.g., the socket of FIG. 20).

According to various embodiments, the tray body 610 may include a receiving section 611, a first support 612, a second support 613, a waterproof member 614 or a body fixing groove 615. The tray body 610 may be, for example, mounted in the housing 410 to accommodate the external storage medium, and provide an electrical connection with the external storage medium and other electronic components (e.g., a printed circuit board) disposed in the housing 410.

According to an embodiment, the tray body 610 may include a receiving section 611. The receiving section 611 may be, for example, a space for accommodating an external storage medium. In FIG. 6 is illustrated an embodiment in which only one receiving section 611 is arranged to accommodate the external storage medium, but the disclosure is not limited thereto, and a plurality of receiving sections may be provided as necessary.

According to an embodiment, the tray body 610 may include the first support 612 or the second support 613. The first support 612 or the second support 613 may protrude from a front surface 610b (e.g., a surface of −y-axis direction) to extend in a direction toward the tray head 650 (e.g., −y-axis direction). The first support 612 and the second support 613 may be coupled to a respective lever (e.g., a first lever 631 or a second lever 632), respectively. The first support 612 and the second support 613 may be positioned with different heights in z-axis direction perpendicular to a longitudinal direction of the front surface 610b of the tray body 610.

According to an embodiment, the first support 612 may form a first body coupling hole 6121 at its free end, and the second support 613 may form a second body coupling hole 6131 at its free end. The first body coupling hole 6121 may be arranged to fixedly couple the first lever 631 to the tray body 610. The second body coupling hole 6131 may be arranged to fixedly couple the second lever 632 to the tray body 610. Accordingly, rotation axes of the first lever 631 and the second lever 632 may be located at positions corresponding to the first body coupling hole 6121 and the second body coupling hole 6131, respectively. Although two support parts are illustrated in FIGS. 6 to 9, the disclosure is not limited thereto and one or at least three support parts may be provided depending upon to the number of the levers.

According to an embodiment, the tray body 610 may include the waterproof member 614. The waterproof member 614 may be arranged, for example, along a periphery of the front surface 610b of the tray body 610. That is to say, the waterproof member 614 may be located adjacent to the front surface 610b of the tray body 610. As such, while the tray 600 is mounted onto the housing 410, the waterproof member 614 may be in close contact with an opening (e.g., the opening 412 of FIG. 4) of the housing 410. As the waterproof member 614 is either in close contact with the opening 412 of the housing 410 or positioned between the tray 600 and the housing 410, it is possible to prevent any liquid from flowing into the tray body 610 from the outside. The waterproof member 614 may be formed of, for example, an elastic material.

According to an embodiment, the tray body 610 may include a body fixing groove 615. For example, when the tray 600 is mounted onto the housing 410, the body fixing groove 615 may be a groove into which a fixing member (e.g., a fixing member 2010 of FIG. 20) of the socket 2000 (e.g., a socket 2000 of FIG. 20) is received, so that the tray body 610 is not separated from the socket 2000.

According to various embodiments, the lever assembly 630 may include the first lever 631, the second lever 632, a coupling pin 633, a first rotation axis pin 634, a second rotation axis pin 635, a first push pin 636 or a second push pin 637. The lever assembly 630 may be arranged, for example, such that its rotation axis is fixed to the tray body 610. The lever assembly 630 may be arranged in between the tray body 610 and the tray head 650, thereby serving to indirectly couple the tray body 610 and the tray head 650.

According to an embodiment, the lever assembly 630 may include the first lever 631. The first lever 631 may include a plurality of holes through which pins pass. According to an embodiment, the first lever 631 may include a first rotation axis hole 6311, a first coupling hole 6312, or a first push hole 6313. The first coupling hole 6312 may be located at one end 631a of the first lever 631. The first coupling hole 6312 may be arranged, for example, for coupling with the second lever 632. The first push hole 6313 may be located at the other end 631b of the first lever 631. The first push hole 6313 may be arranged, for example, to insert a pin (e.g., the first push pin 636) for pressing the tray head 650. The first rotation axis hole 6311 may be arranged between one end 631a of the first lever 631 and the other end 631b of the first lever 631. That is to say, the first rotation axis hole 6311 may be arranged between the first coupling hole 6312 and the first push hole 6313. The first rotation axis hole 6311 may be arranged, for example, to couple the first lever 631 to the tray body 610 and fix its rotation axis.

According to an embodiment, the lever assembly 630 may include the second lever 632. The second lever 632 may include a plurality of holes through which pins pass. According to an embodiment, the second lever 632 may include a second rotation axis hole 6321, a second coupling hole 6322, or a second push hole 6323. The second coupling hole 6322 may be located at one end 632a of the second lever 632. The second coupling hole 6322 may be arranged, for instance, for coupling with the first lever 631. The second push hole 6323 may be arranged at the other end 632b of the second lever 632. The second push hole 6323 may be arranged, for example, to insert a pin (e.g., the second push pin 637) for pressing the tray head 650. The second rotation axis hole 6321 may be arranged between one end 632a of the second lever 632 and the other end 632b of the second lever 632. In other words, the second rotation axis hole 6321 may be arranged in between the second coupling hole 6322 and the second push hole 6323. The second rotation axis hole 6321 may be arranged, for example, to couple the second lever 632 to the tray body 610 and fix its rotation axis.

According to an embodiment, the lever assembly 630 may include a coupling pin 633. The coupling pin 633 may be arranged, for example, to pass through the first coupling hole 6312 and the second coupling hole 6322 so that one end 631a of the first lever 631 and one end 632a of the second lever 632 can at least partially overlap each other. The one end 631a of the first lever 631 and the one end 632a of the second lever 632 may vertically overlap. The coupling pin 633 may be disposed in a receiving space 654 in the tray head 650.

According to an embodiment, the coupling pin 633 may include a polymer material and/or a metal material. For example, the coupling pin 633 may include a rivet.

According to another embodiment, the lever assembly 630 may include a single lever (e.g., the first lever 631 or the second lever 632). When the lever assembly 630 is formed of one lever, the coupling pin 633 and the coupling hole (e.g., the first coupling hole 6312 and the second coupling hole 6322) may be omitted. Further, when it is formed with only one lever, the support part of the tray body 610 may also be one.

According to an embodiment, the lever assembly 630 may include a first rotation axis pin 634. The first rotation axis pin 634 may be arranged, for example, to pass through a portion of the tray body 610 and the first rotation axis hole 6311. The first rotation axis pin 634 may pass through the first body coupling hole 6121 arranged in the first support 612 of the tray body 610. Both ends of the first rotation axis pin 634 may be provided to pass through at least one surface of an upper surface portion 650a and a lower surface portion 650b of the tray head 650. The first rotation axis pin 634 may be arranged, for example, to sequentially pass through the lower surface portion 650b of the tray head 650, the first body coupling hole 6121 arranged in the first support 612, the first rotation axis hole 6311 and the upper surface portion 650a of the tray head 650. The first rotation axis pin 634 is fixedly coupled to the tray body 610 when the tray head 650 is pulled-out from the housing 410 and thus it does not move. However, since the first rotation axis pin 634 may be moved with respect to at least one of the upper surface portion 650a or the lower surface portion 650b of the tray head 650 in relation to the tray head 650, a first guide hole 6511 for this movement may be provided. When the tray head 650 is pulled-out from the housing 410, the first rotation axis pin 634 may be moved in +y-axis direction relative to the tray head 650 along the first guide hole 6511.

According to an embodiment, the lever assembly 630 may include the second rotation axis pin 635. The second rotation axis pin 635 may be arranged, for example, to pass through a portion of the tray body 610 and the second rotation axis hole 6321. The second rotation axis pin 635 may pass through the second body coupling hole 6131 arranged in the second support 613 of the tray body 610. The second rotation axis pin 635 may be arranged such that both ends thereof pass through at least one of the upper surface portion 650*a* and the lower surface portion 650*b* of the tray head 650. The second rotation axis pin 635 may be arranged, for example, to pass through the lower surface portion 650*b*, the second rotation axis hole 6321 and the second support 613 of the tray head 650, in sequence. The second rotation axis pin 635 does not move because it is fixedly coupled to the tray body 610 when the tray head 650 is drawn out from the housing 410. However, as the second rotation axis pin 635 moves with respect to the upper surface portion 650*a* and/or the lower surface portion 650*b* of the tray head 650 in relation to the tray head 650, the second guide hole 6512 for this purpose may be provided. When the tray head 650 is drawn out from the housing 410, the second rotation axis pin 635 may be moved in +y-axis direction relative to the tray head 650 along the second guide hole 6512.

According to an embodiment, the lever assembly 630 may include the first push pin 636. The first push pin 636 may, for example, pass through the first push hole 6313 of the first lever 631. Further, both ends of the first push pin 636 may be provided to pass through at least one of the upper surface portion 650*a* and the lower surface portion 650*b* of the tray head 650. The first push pin 636 may be arranged, for example, to pass through the lower surface portion, the first push hole 6313 and the upper surface portion 650*a* of the tray head 650, in sequence.

According to an embodiment, the lever assembly 630 may include the second push pin 637. The second push pin 637 may, for example, pass through the second push hole 6323 of the second lever 632. Further, both ends of the second push pin 637 may be provided to pass through at least one surface of the upper surface portion 650*a* and the lower surface portion 650*b* of the tray head 650. The second push pin 637 may be arranged, for example, to pass through the lower surface portion 650*b*, the second push hole 6323, and the upper surface portion 650*a* of the tray head 650, in sequence.

According to another embodiment, in the lever assembly 630, the first push pin 636 and the second push pin 637 may be omitted. Accordingly, the first push hole 6313, the second push hole 6323, the third guide hole 6513 and the fourth guide hole 6514 that are provided for the first push pin 636 and the second push pin 637 may also be omitted. When the first push pin 636 and the second push pin 637 are omitted, the lever assembly 630 may draw out the tray head 650 in such a manner that a part of the other end 631*b* of the first lever 631 and a part of the other end 632*b* of the second lever 632 press the inside of the front portion 650*c* of the tray head 650.

According to an embodiment, the tray head 650 may include a front portion 650*c* disposed in a direction of one side (e.g., the side 411 of FIG. 4) of the electronic device (e.g., the electronic device 400 of FIG. 4), and the upper surface portion 650*a*, the lower surface portion 650*b*, or a side surface portion 650*d*, extending vertically from an edge of the front portion 650*c* to the tray body 610. The tray head 650 may have an opening at its rear side. The tray head 650 may have a receiving space 654 defined by the front portion 650*c*, the upper surface portion 650*a*, the lower surface portion 650*b*, and the side part. The receiving space 654 may accommodate, for example, a portion of the tray body 610 and the lever assembly 630. Specifically, the supports (the first support 612 and the second support 613) of the tray body 610 may be accommodated in the receiving space 654.

According to various embodiments, the tray head 650 may include a guide hole 651, an eject hole 652 or a locking groove 653. The tray head 650 may be, for example, arranged to be coupled to the lever assembly 630 to be movable with respect to the tray body 610 by movement of the lever assembly 630.

According to an embodiment, the tray head 650 may include the guide hole 651. The guide hole 651 may include a first guide hole 6511 for guiding movement of the first rotation axis pin 634, a second guide hole 6512 for guiding movement of the second rotation axis pin 635, and a third guide hole 6513 for guiding movement of the first push pin 636, or a fourth guide hole 6514 for guiding movement of the second push pin 637. These first to fourth guide holes 6511, 6512, 6513 and 6514 may be formed in at least one of the upper surface portion 650*a* or the lower surface portion 650*b* of the tray head 650. The first guide hole 6511 and the second guide hole 6512 may be formed to extend in a direction in which the tray head 650 is drawn out (e.g., y-axis direction). The first guide hole 6511 and the second guide hole 6512 may be arranged spaced apart from each other by a predetermined distance and in parallel. The extending direction of the first guide hole 6511 and the second guide hole 6512 may correspond to the extending direction of the first support 612 or the second support 613 of the tray body 610.

The first guide hole 6511 and the second guide hole 6512 may for example guide the first rotation axis pin and the second rotation axis pin 635 with respect to the tray head 650 while the tray head 650 is moved with respect to the tray body 610. The third guide hole 6513 and the fourth guide hole 6514 may, for example, guide the movement of the first push pin 636 and the second push pin 637 with respect to the tray head 650. The third guide hole 6513 may be arranged out of the first guide hole 6511. Here, it may be defined that the closer it is located from the center of the tray head 650 to the side surface portion 650*d*, the more it is located on the outside. The third guide hole 6513 may extend in a direction perpendicular to the extending direction of the first guide hole 6511. The fourth guide hole 6514 may be arranged out of the second guide hole 6512. The fourth guide hole 6514 may extend in a direction perpendicular to the extending direction of the second guide hole 6512. That is, the third guide hole 6513 and the fourth guide hole 6514 may extend in a direction parallel to the front portion 650*c* of the tray head 650. A width of each guide hole 651 may correspond to a length of diameter of the pin. According to another embodiment, the third guide hole 6513 and the fourth guide hole 6514 may extend in an oblique direction.

According to an embodiment, the first guide hole 6511, the second guide hole 6512, the third guide hole 6513 and/or the fourth guide hole 6514 that are arranged in the upper surface portion 650*a* and/or the lower surface portion 650*b* of the tray head 650 may not be visually exposed when viewed from the outside. For example, at least one of the first rotation axis pin 634, the second rotation axis pin 635, the first push pin 636, or the second push pin 637 may be disposed within the tray head 650, and at least one of a metal or polymer material may be disposed at outer side at least one of the first guide hole 6511, the second guide hole 6512, the third guide hole 6513, or the fourth guide hole 6514. For example, a plate (not shown) may be disposed covering at least one of the first guide hole 6511, the second guide hole 6512, the third guide hole 6513, or the fourth guide hole 6514.

According to some embodiments, for at least one portion of the upper surface portion 650*a* and the lower surface portion 650b of the tray head 650, the configuration of the first guide hole 6511, the second guide hole 6512, the third guide hole 6513 and/or the fourth guide hole 6514 may be omitted, and grooves corresponding to the shape of at least one of the first guide hole 6511, the second guide hole 6512, the third guide hole 6513, or the fourth guide hole 6514 may arranged within at least one of the upper surface portion 650a or the lower surface portion 650b of the tray head 650. For example, at least one of the first rotation axis pin 634, the second rotation axis pin 635, the first push pin 636, or the second push pin 637 may be guided by the grooves formed inside the tray head 650. For the portions where the grooves are formed, at least one of the first rotation axis pin 634, the second rotation axis pin 635, the first push pin 636, or the second push pin 637 may not be visible from the outside.

According to an embodiment, the tray head 650 may include the eject hole 652. The eject hole 652 may be arranged, for example, in the front portion 650c of the tray head 650 so that an external member (e.g., the eject pin P) is inserted for pressing and rotating a portion of the lever assembly. As shown, the eject hole 652 may be located in the center of the front portion 650c of the tray head 650, but is not limited thereto, and its position may vary depending on the structure of the lever assembly.

According to various embodiments, as shown in FIG. 35, when the front portion 650c of the tray head 650 is viewed from the outside in the +y-axis direction, the eject hole 652 may be located at a position where it overlaps the tray body 610. Alternatively, the eject hole 652 may be located at a position where it overlaps the tray body 610 when the front portion 650c of the tray head 650 is viewed from the outside in the direction the tray 600 is mounted onto the housing 410. Alternatively, the eject hole 652 may be located at a position where it overlaps the tray body 610 when the front portion 650c of the tray head 650 is viewed from the outside in a direction parallel to a longitudinal direction of the tray 600. Accordingly, the tray 600 according to various embodiments does not need to provide a separate additional space for the eject hole 652 to unnecessarily expand the size of the tray head 650.

According to an embodiment, the tray head 650 may include a locking groove 653. The locking groove 653 may be formed, for example, in the side surface portion 650d of the tray head 650. The locking groove 653 may be positioned adjacent to the front portion 650c of the tray head 650 from the side surface portion 650d of the tray head 650. As shown in FIG. 5, when a part of the tray head 650 is drawn out of the housing 410, the user can easily grip the tray head 650 using the locking groove 653 to remove the tray 600.

According to some embodiments, the electronic device (e.g., the electronic device 400 of FIG. 4) may be provided with a locking structure (not shown) that can prevent playing of the tray head 650 when the tray 600 is mounted onto the housing 410. The locking structure may be, for example, located at a position corresponding to the locking groove 653 of the tray head 650. The locking structure may be, for example, arranged around the opening 412 of the housing 410. Once the tray 600 is mounted on the housing 410, the locking structure is inserted into the locking groove 653 to prevent the tray head 650 from playing. The locking structure may include, for example, an elastic material.

Figure 9:
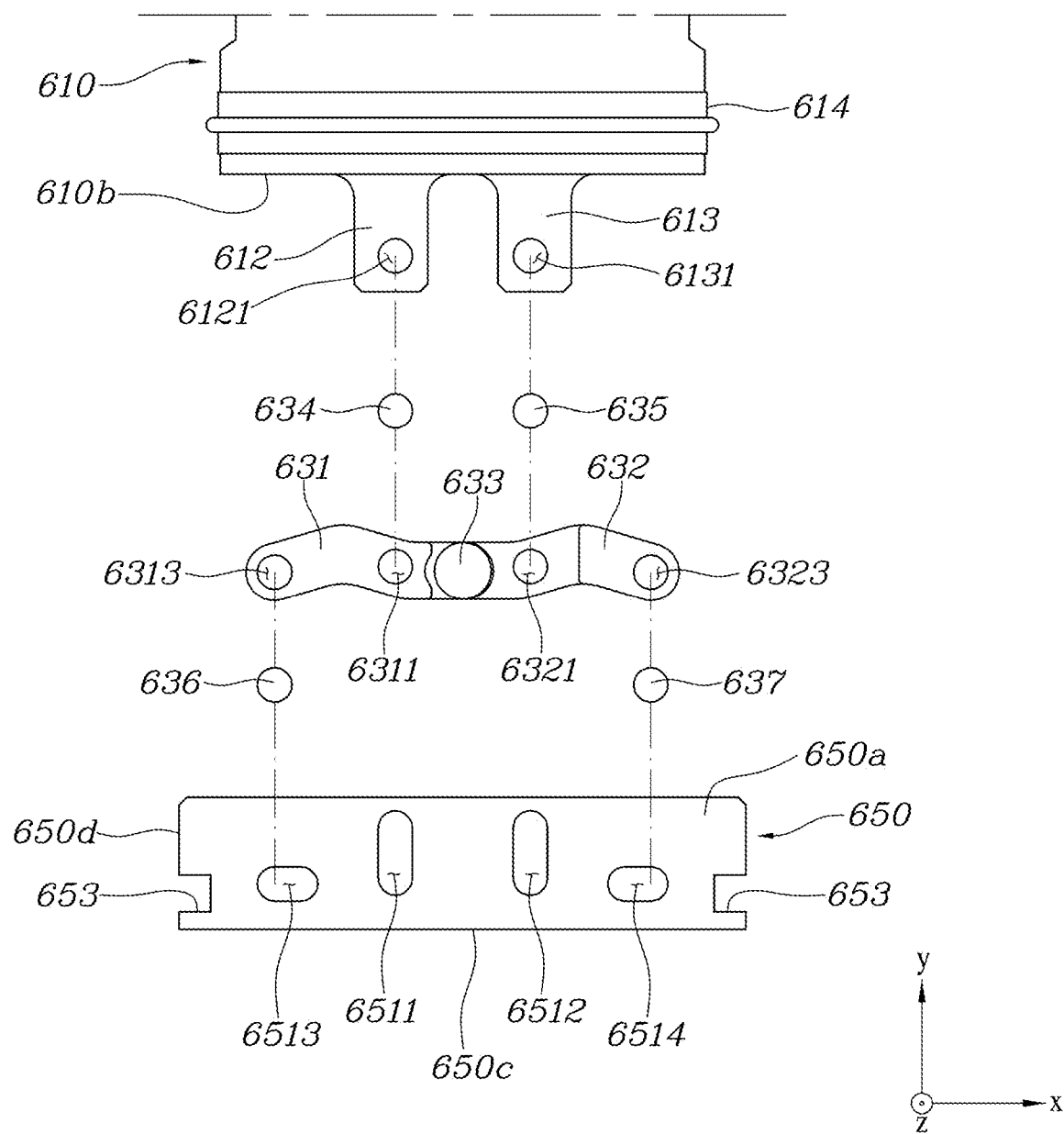
FIG. 9 is an exploded plan view illustrating an example tray assembling process of FIG. 6.

FIG. 9 is an exploded plan view for explaining a tray assembling process of FIG. 6.

The tray assembling process described below is merely of an example, and the tray 600 according to various embodiments of the disclosure may be assembled using different assembling sequences in light of the skill level of those skilled in the art.

The first coupling hole 6312 of the first lever 631 and the second coupling hole 6322 of the second lever 632 may be arranged to be superimposed, and the coupling pin 633 may be arranged to pass through the first coupling hole 6312 and the second coupling hole 6322 to couple the first lever 631 and the second lever 632.

After coupling the first lever 631 and the second lever 632, the other end 631b of the first lever 631 may be positioned to overlap the third guide hole 6513 to couple the first push pin 636, and the other end 632b of the second lever 632 may be positioned to overlap the fourth guide hole 6514 to couple the second push pin 637.

After coupling the first push pin 636 and the second push pin 637, the first rotation axis hole 6311 of the first lever 631 may be positioned to overlap the first body coupling hole 6121 and the first guide hole 6511 of the tray body 610 to couple the first rotation axis pin 634. Further, the second rotation axis hole 6321 of the second lever 632 may be positioned to overlap the second body coupling hole 6131 and the second guide hole 6512 of the tray body 610 to couple the second rotation axis pin 635. In a case in which the coupling pin 633, the first push pin 636 and the second push pin 637 are first coupled to limit the movement of the lever assembly 630, the first rotation axis pin 634 can be easily coupled in their assembling. That is to say, the first push pin 636 and the second push pin 637 can serve to not only draw out the tray head 650 but also more easily perform the assembly between the tray body 610, the lever assembly 630 and the tray head 650 in the assembling process, thereby further simplifying the assembling process in total.

Figure 10:
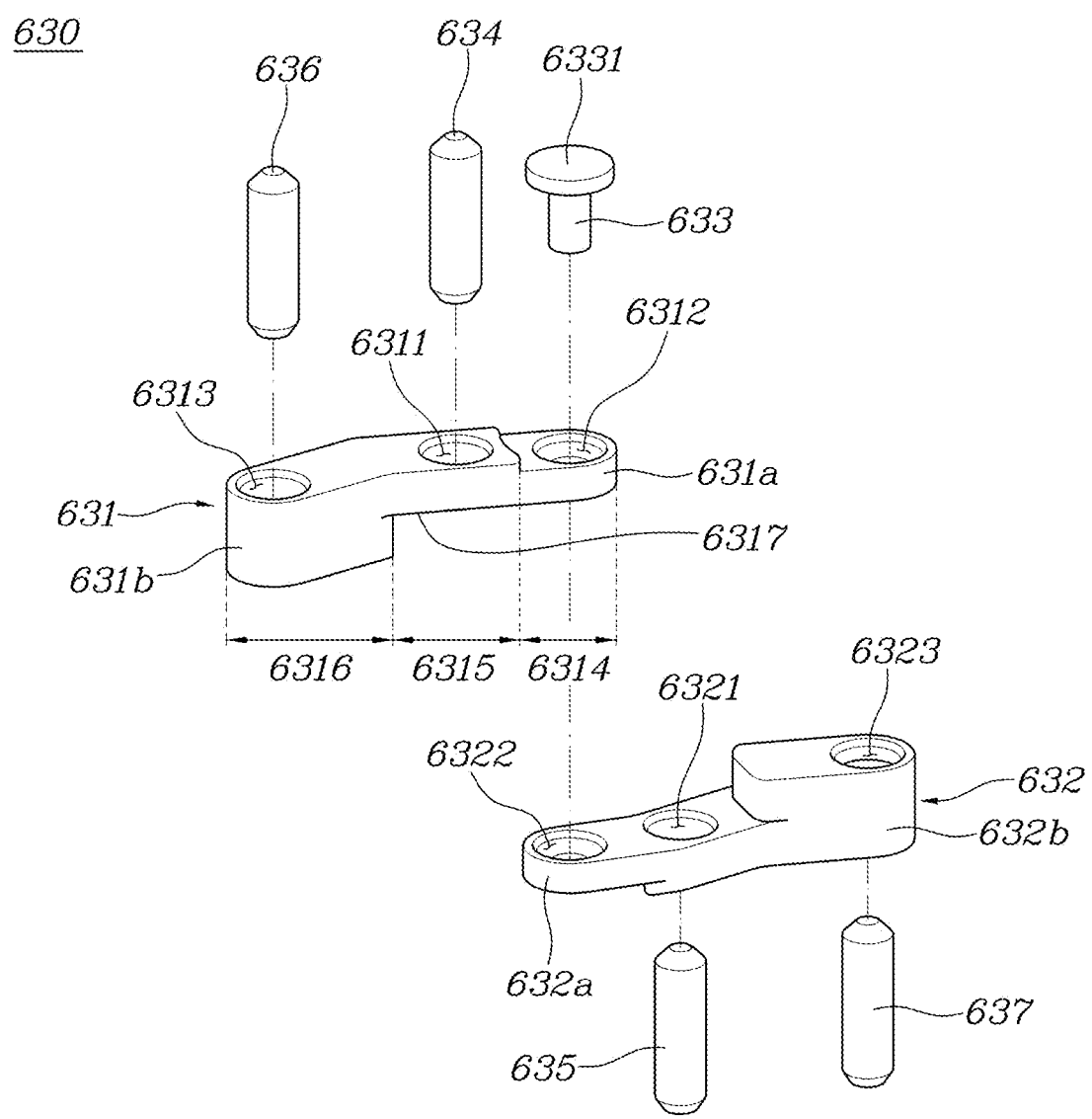
FIG. 10 is a view illustrating coupling relationship between levers and pins according to an embodiment.

FIG. 10 is a view illustrating coupling relationship between the levers and the pins according to an embodiment.

Figure 11:
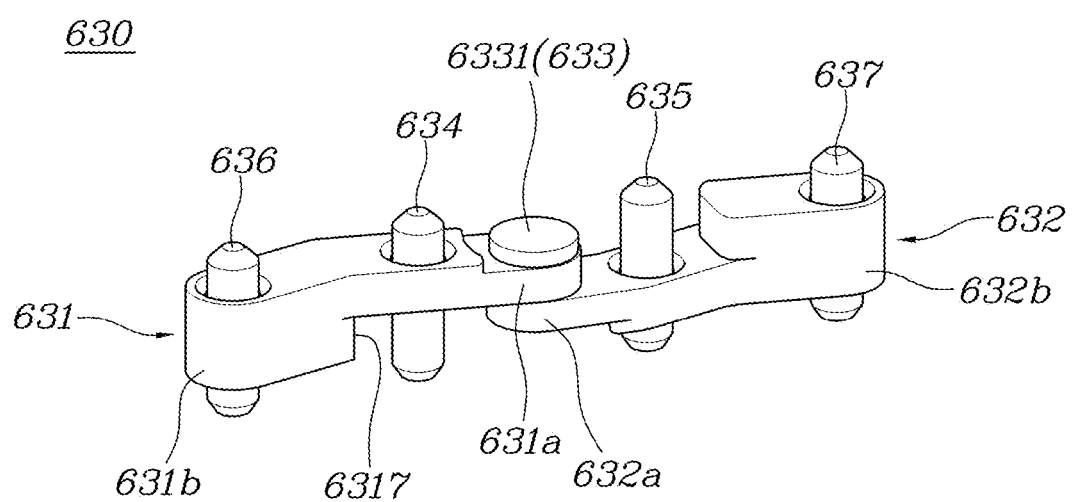
FIG. 11 is a view illustrating a state in which pins are coupled to the levers of FIG. 10.

FIG. 11 is a view illustrating a state in which the pins are coupled to the levers of FIG. 10. The lever assemblies 630 shown in FIGS. 10 and 11 are only of an example, and the disclosure is not limited thereto. It may have various structures of lever assembly 630.

Referring to FIGS. 10 and 11, the first lever 631 and the second lever 632 may have the same shape. Therefore, only the first lever 631 will be described below, and the description of the second lever 632 having the same or similar shape will be omitted.

According to an embodiment, the first lever 631 may be divided into a first portion 6314 located at one end 631a of the first lever 631 according to the difference in thickness (e.g., length in z-axis direction), a second portion 6315 adjacent to the first portion 6314 or a third portion 6316 located at the other end 631b of the first lever 631. The second portion 6315 may be positioned between the first portion 6314 and the third portion 6316.

The first portion 6314, the second portion 6315, and the third portion 6316 may have different thicknesses from each other, respectively. The lever assembly 630 may be accommodated in a receiving space (e.g., the receiving space 654 of FIG. 8) of a tray head (e.g., the tray head 650 of FIG. 8) together with a support (e.g., the first support 612 or the second support 613 in FIG. 8) of a tray body (e.g., the tray body 610 in FIG. 8), and in order to efficiently utilize the receiving space 654, each portion of the first lever 631 may have a different thickness. In the case of the first portion 6314 of the first lever 631, it should overlap the one end 632a of the second lever 632 and the head portion 6331 of the coupling pin 633 be also accommodated in the receiving space 654, so its thickness may be thinner than that of the second portion 6315 and the third portion 6316. In the case of the second portion 6315, it should overlap the first support 612 of the tray body 610 and have a first support receiving groove 6317, so its thickness may be thinner than the third portion 6316 by the thickness of the first support 612. In the case of the third portion 6316, its thickness may be the thickest since there are no other components that should overlap. Due to this thickness step, the lever assembly 630, the first support 612, and the second support 613 may be efficiently arranged in the limited receiving space 654.

According to an embodiment, the first rotation axis pin 634, the second rotation axis pin 635, the first push pin 636 and/or the second push pin 637 may include a head portion (not shown). For example, the first rotation axis pin 634, the second rotation axis pin 635, the first push pin 636, and/or the second push pin 637 may have the same or similar structure as the head portion 6331 of the coupling pin 633. For example, the first rotation axis pin 634, the second rotation axis pin 635, the first push pin 636, and/or the second push pin 637 may include a rivet.

Figure 12:
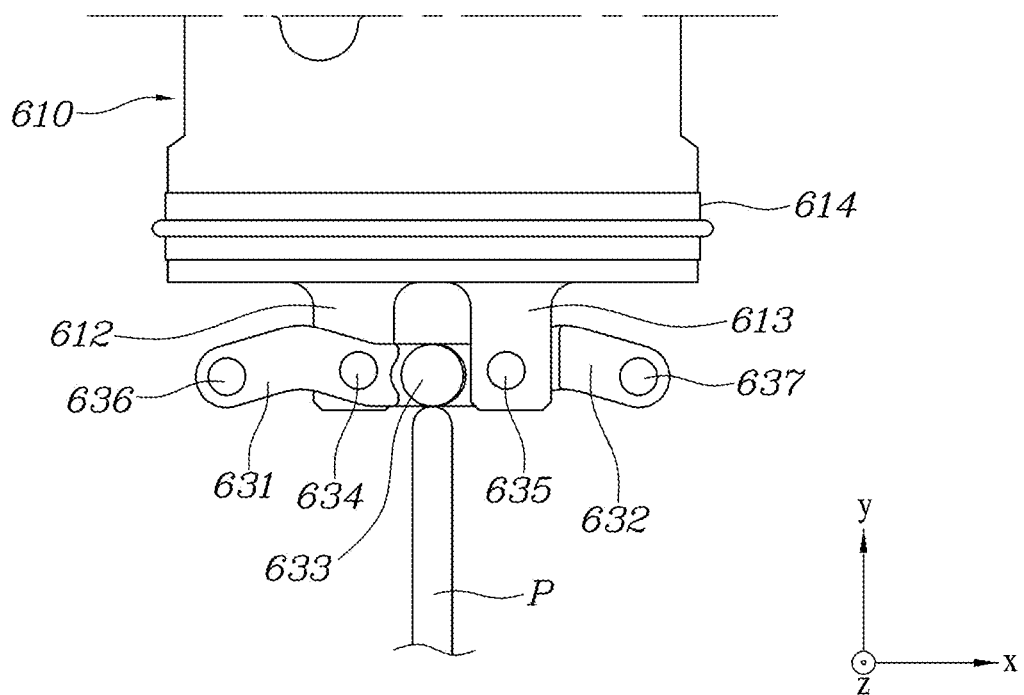
FIGS. 12 and 13 are views illustrating an example operation of a lever assembly mounted onto the tray of FIG. 6.
Figure 13:
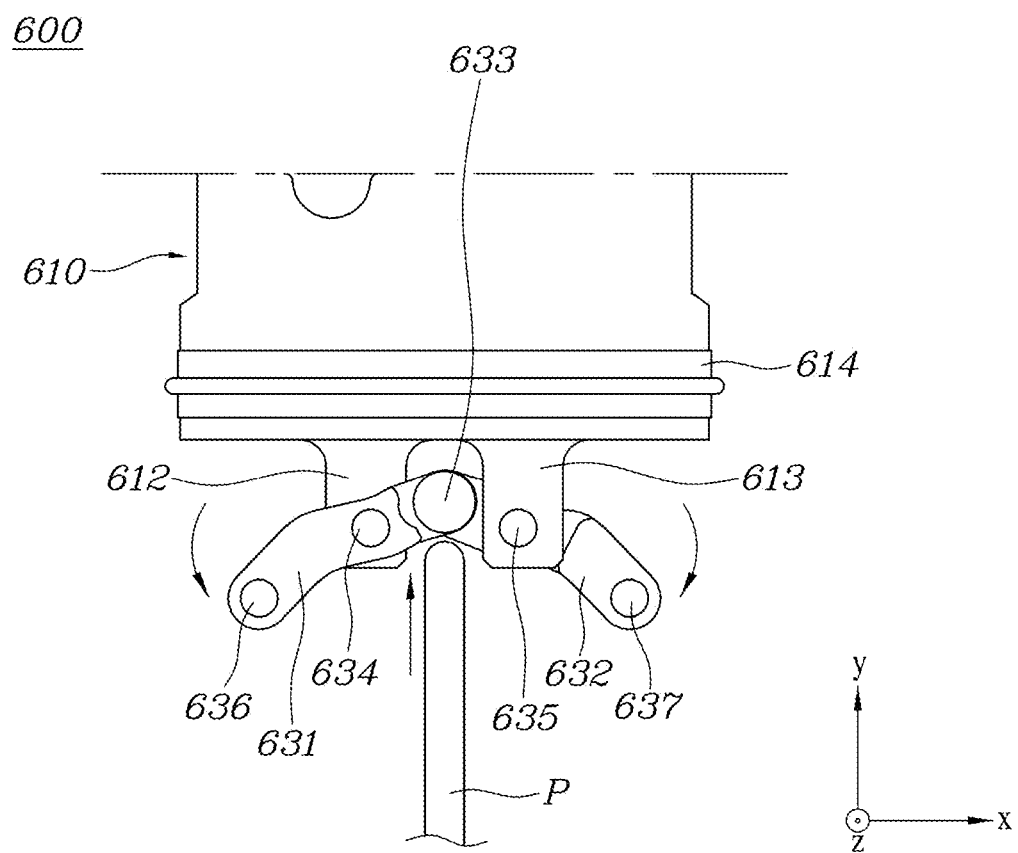

FIGS. 12 and 13 are views illustrating an example operation of the lever assembly mounted onto the tray of FIG. 6.

FIGS. 12 and 13 are for explaining the operation of the lever assembly 630 according to pressing of an external member (e.g., the eject pin P), with the configuration of the tray head (e.g., the tray head 650 of FIG. 6) being omitted in illustration. In more detail, FIG. 12 is a view before the lever assembly 630 is pressed by the external member (e.g., the eject pin P), and FIG. 13 is a view when the lever assembly 630 is pressed by the external member (e.g., the eject pin P). In the description of FIGS. 12 and 13, some reference numerals therein are omitted for any components that can be easily understood from the preceding drawings, and their detailed descriptions may also be omitted.

Referring to FIGS. 12 and 13, the lever assembly 630 may be pressed by the eject pin P. This eject pin P may press a portion where the first lever 631 and the second lever 632 overlap. That is, the eject pin P may press the position where the coupling pin 633 is located, in a direction toward the tray body 610 (e.g., +y-axis direction). When the eject pin P presses the lever assembly 630, the first lever 631 and the second lever 632 may rotate about their rotation axis. The first lever 631 may rotate counterclockwise with reference to FIG. 12, and the second lever 632 may rotate clockwise with reference to FIG. 12. As the coupling pin 633 is pressed in +y-axis direction to rotate the first lever 631 counterclockwise, the other end 631b (or the first push pin 636) of the first lever 631 may be moved in +x-axis direction and −y-axis direction and the first rotation axis pin 634 may be fixed. As the coupling pin 633 is pressed in +y-axis direction to rotate the second lever 632 clockwise, the other end 632b (or the second push pin 637) of the second lever 632 may be moved in −x-axis direction and −y-axis direction and the second rotation axis pin 635 may be fixed.

In a case in which the coupling pin 633 is pressed in +y-axis direction by the eject pin P, the tray body 610 may also be pressed in +y-axis direction. With the tray body 610 being pressed in +y-axis direction, while the tray head (e.g., the tray head 650 of FIG. 6) is drawn out from the housing (e.g., the housing 410 of FIG. 4), the tray body 610 may be pressed in +y-axis direction to be fixedly mounted into the housing 410. Accordingly, even if the user accidentally drops the tray 600 onto a floor or into water while drawing out the tray head 650 using the eject pin P to remove the tray 600, there is less likely to have malfunction due to the tray 600 being separated from the housing 410. Further, even if the tray 600 fell into water, it can be waterproofed by the waterproof member 614 of the tray body 610 to protect the external storage medium accommodated in the tray body 610.

According to various embodiments, the user may use the eject pin (P) to press the lever assembly 630 as well as the tray body 610 in which the external storage medium is accommodated, in an inward direction of the housing (e.g., the housing 410 in FIG. 4).

Figure 14:
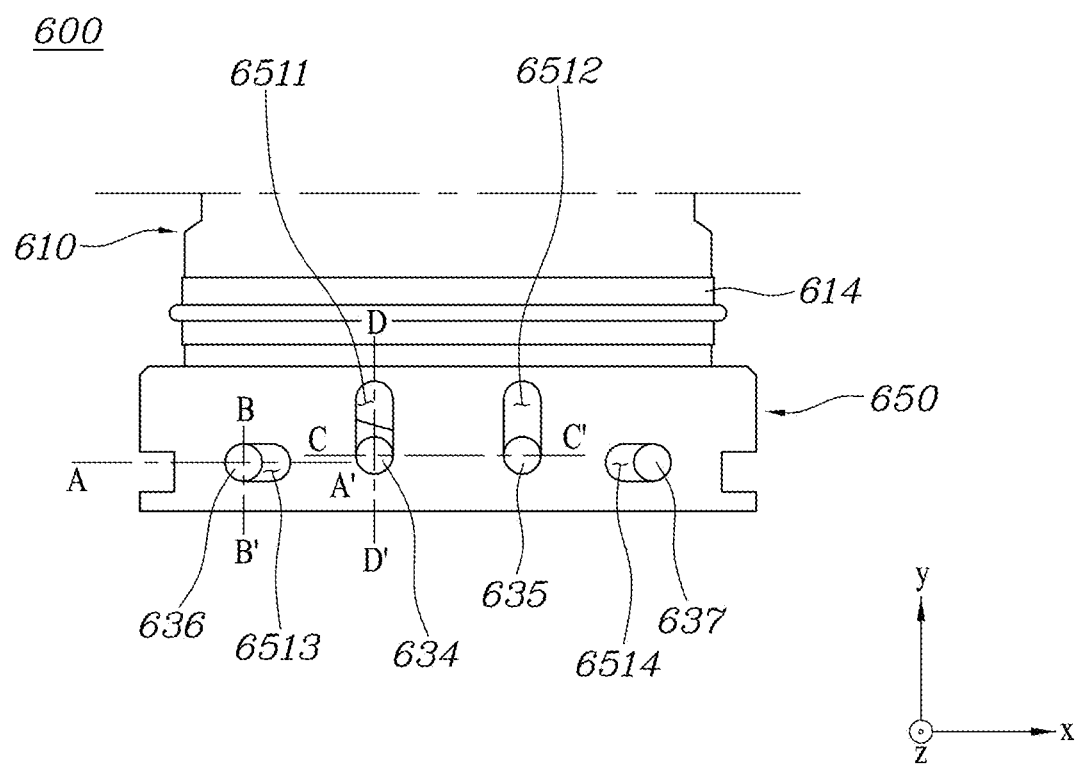
FIGS. 14 and 15 are views illustrating movement of a tray head according to the operation of the lever assembly of FIG. 6.
Figure 15:
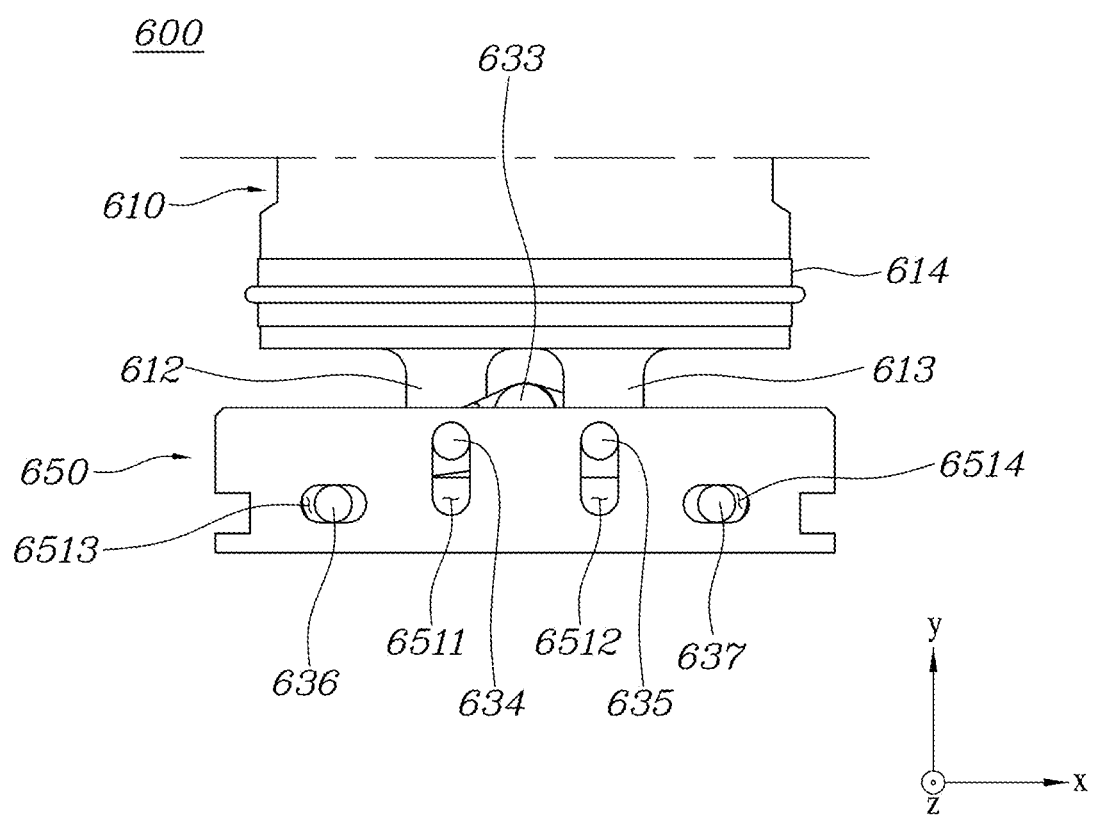

FIGS. 14 and 15 are views for explaining the movement of the tray head according to the operation of the lever assembly of FIG. 6.

Hereinafter, the coupling relationship with the tray head 650 will be described in detail based on the operation of the lever assembly 630 described with reference to FIGS. 12 and 13. In the description of FIGS. 14 and 15, reference numerals therein may be omitted for any components that can be easily understood from the preceding drawings, and their detailed descriptions may also be omitted as well.

Referring to FIGS. 14 and 15, a plurality of guide holes 651 may be arranged for guiding movement relative to the tray head 650 of the first rotation axis pin 634, the second rotation axis pin 635, the first push pin 636, or the second push pin 637. When the lever assembly 630 is pressed, the tray head 650 may be moved in −y-axis direction by rotation.

According to an embodiment, in a case in which the tray head 650 is moved in −y-axis direction, the first rotation axis pin 634 and the second rotation axis pin 635 of the lever assembly 630 may be fixed to the tray body 610. However, in order for the tray head 650 to move in −y-axis direction, a room may be required for the first rotation axis pin 634 and the second rotation axis pin 635 to move in +y-axis direction relative to the tray head 650. Accordingly, as the first guide hole 6511 and the second guide hole 6512 extend in y-axis direction to move the tray head 650, such a room may be provided for movement of the first rotation axis pin 634 and the second rotation axis pin 635.

According to an embodiment, when the tray head 650 is moved in −y-axis direction, the first push pin 636 may move in −y-axis direction and +x-axis direction, and the second push pin 637 may move in −y-axis direction and −x-axis direction. Amongst the movement components of the first push pin 636 and the second push pin 637, the −y-axis direction component may be used to push the tray head 650 in −y-axis direction. The third guide hole 6513 and the fourth guide hole 6514 may be formed to extend in a direction (e.g., x-axis direction) parallel to the front portion 650c of the tray head 650 in order to guide movement in +x-axis direction of the first push pin 636 and movement in −x-axis direction of the second push pin 637.

Figure 16:
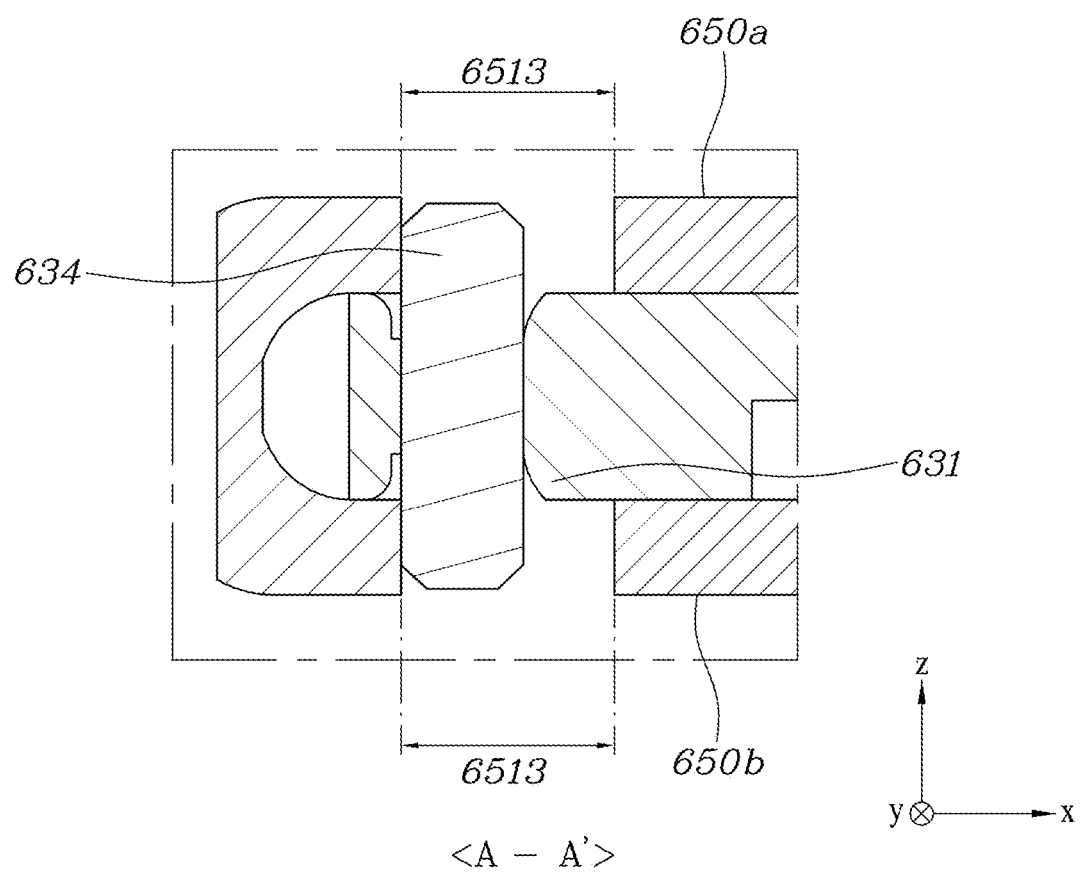
FIG. 16 is a partial cross-sectional view taken along a line A-A' in FIG. 14.

FIG. 16 is a partial cross-sectional view taken along a line A-A' in FIG. 14.

Figure 17:
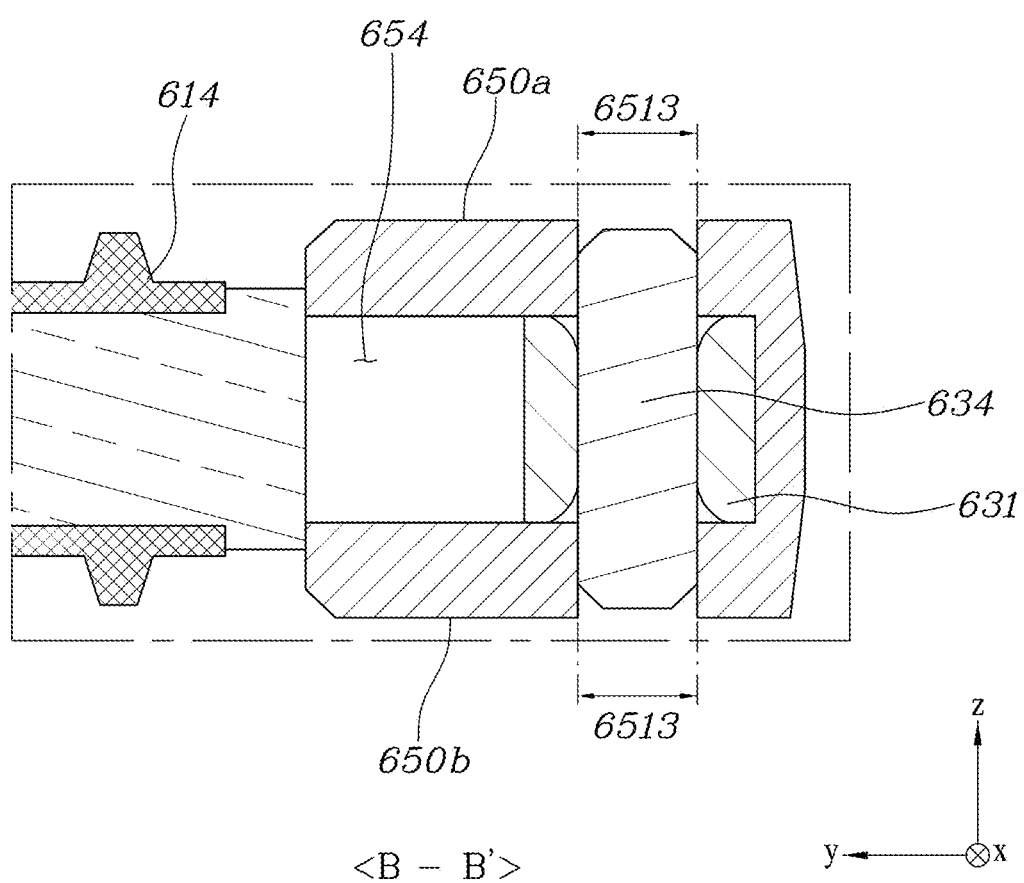
FIG. 17 is a partial cross-sectional view taken along a line B-B' in FIG. 14.

FIG. 17 is a partial cross-sectional view taken along a line B-B' in FIG. 14.

FIGS. 16 and 17 are cross-sectional views for explaining the coupling relationship between the third guide hole 6513 and the first push pin 636. Since the fourth guide hole 6514 and the second push pin 637 have a symmetrical structure with respect to the third guide hole 6513 and the first push pin 636, their descriptions will be omitted. In the description of FIGS. 16 and 17, reference numerals thereof may be omitted for any components that can be easily understood from the preceding drawings, and their detailed descriptions may also be omitted.

Referring to FIG. 16, the length of the third guide hole 6513 in x-axis direction may be formed to be longer than a length of the diameter of the first push pin 636. Accordingly, the first push pin 636 may be played in x-axis direction within the third guide hole 6513.

Referring to FIG. 17, the length in y-axis direction of the third guide hole 6513 may be substantially the same as the length of the diameter of the first push pin 636. That is, the length of the third guide hole 6513 in y-axis direction may correspond to the length of the diameter of the first push pin 636. Accordingly, the movement of the first push pin 636 in y-direction within the third guide hole 6513 may be fixed. As a result, the tray head 650 may move as much as the distance travelled in the y-axis direction of the first push pin 636.

Figure 18:
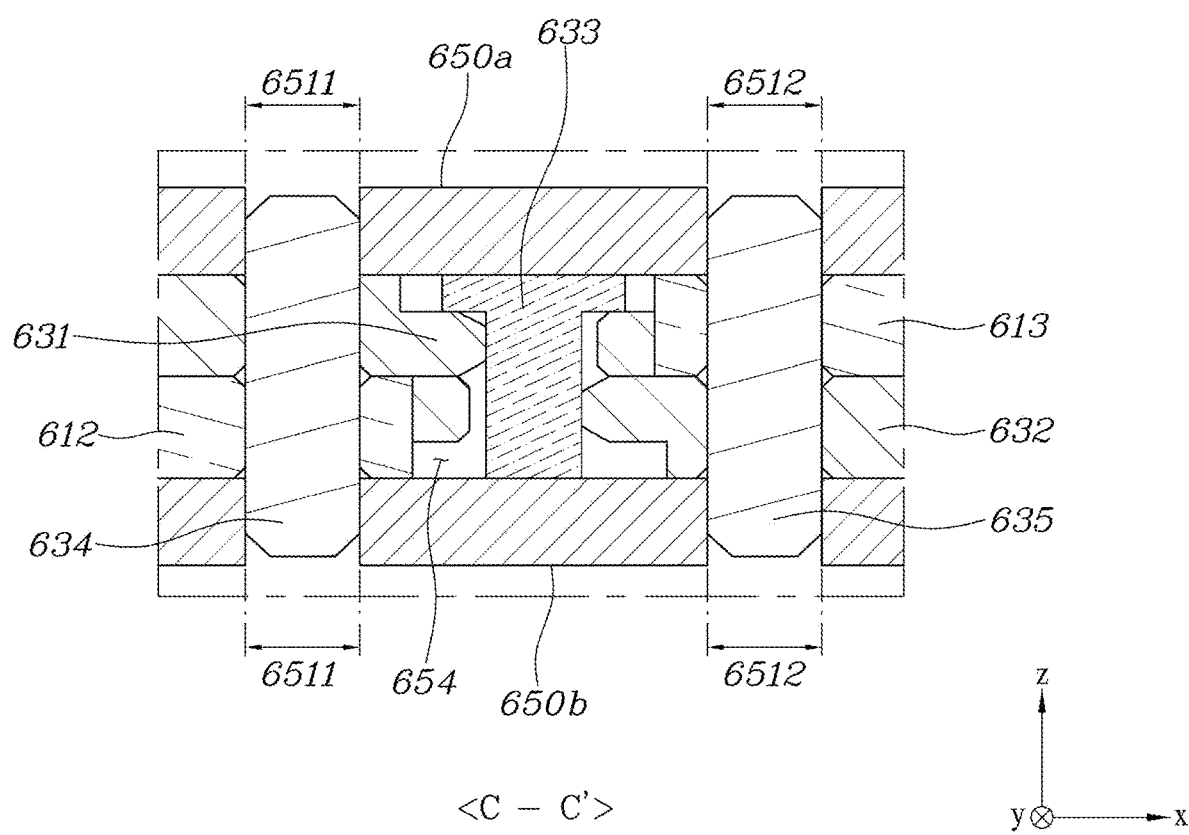
FIG. 18 is a partial cross-sectional view taken along a line C-C' in FIG. 14.

FIG. 18 is a partial cross-sectional view taken along the line C-C' in FIG. 14.

Figure 19:
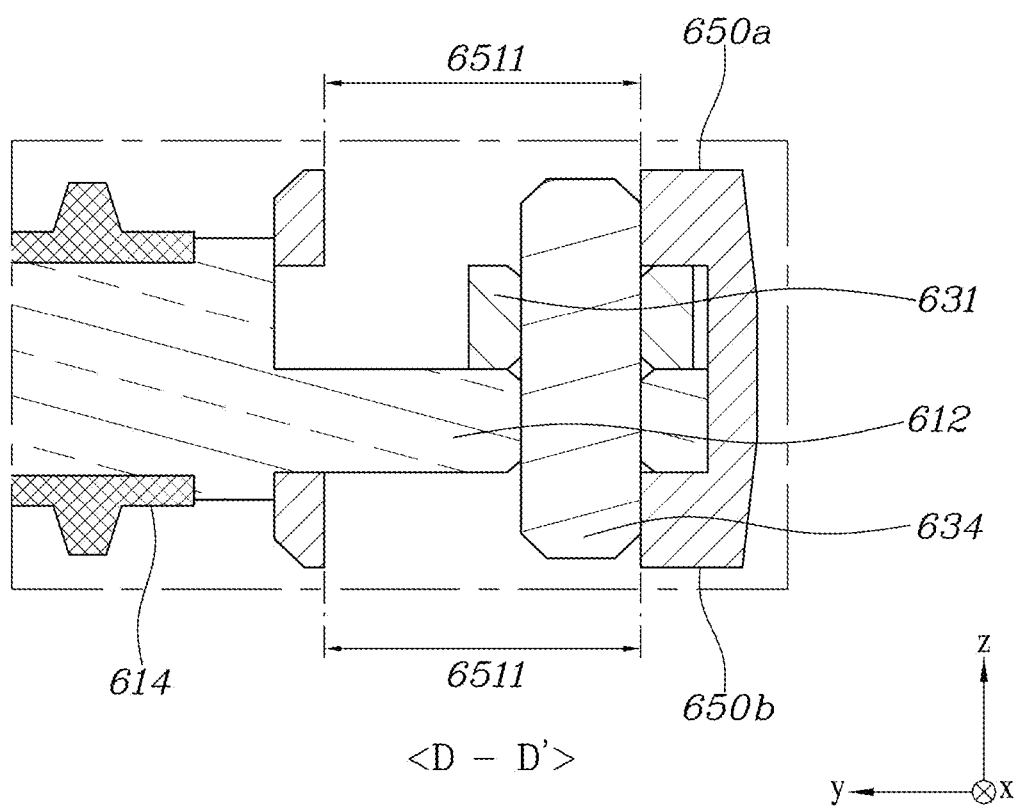
FIG. 19 is a partial cross-sectional view taken along a line D-D' in FIG. 14.

FIG. 19 is a partial cross-sectional view taken along the line D-D' in FIG. 14.

FIGS. 18 and 19 are cross-sectional views for explaining the coupling relationship between the first guide hole 6511 and the first rotation axis pin 634. Since the second guide hole 6512 and the second rotation axis pin 635 have a symmetric structure with respect to the first guide hole 6511 and the first rotation axis pin 634, their descriptions will be omitted. In the description of FIGS. 18 and 19, reference numerals thereof may be omitted for any components that can be easily understood from the preceding drawings, and their detailed description may also be omitted.

Referring to FIG. 18, the length of the first guide hole 6511 in x-axis direction may be substantially the same as the length of the diameter of the first rotation axis pin 634. That is to say, the length of the first guide hole 6511 in x-axis direction may correspond to the length of the diameter of the first rotation axis pin 634. Accordingly, the movement of the first rotation axis pin 634 in x-direction within the first guide hole 6511 may be fixed. This may serve to guide the tray head 650 to be stably drawn out in a direction parallel to y-axis direction without twisting, when drawing out the tray head 650.

Referring to FIG. 19, the length of the first guide hole 6511 in y-axis direction may be formed to be longer than the length of the diameter of the first rotation axis pin 634. Accordingly, the first rotation axis pin 634 may be played in y-axis direction within the first guide hole 6511. That is to say, since the first rotation axis pin 634 is fixed with respect to the tray body 610, the first guide hole 6511 may be arranged for the first rotation axis pin 634 to be played relative to y-axis direction so as for the tray head 650 to be drawn out.

Figure 20:
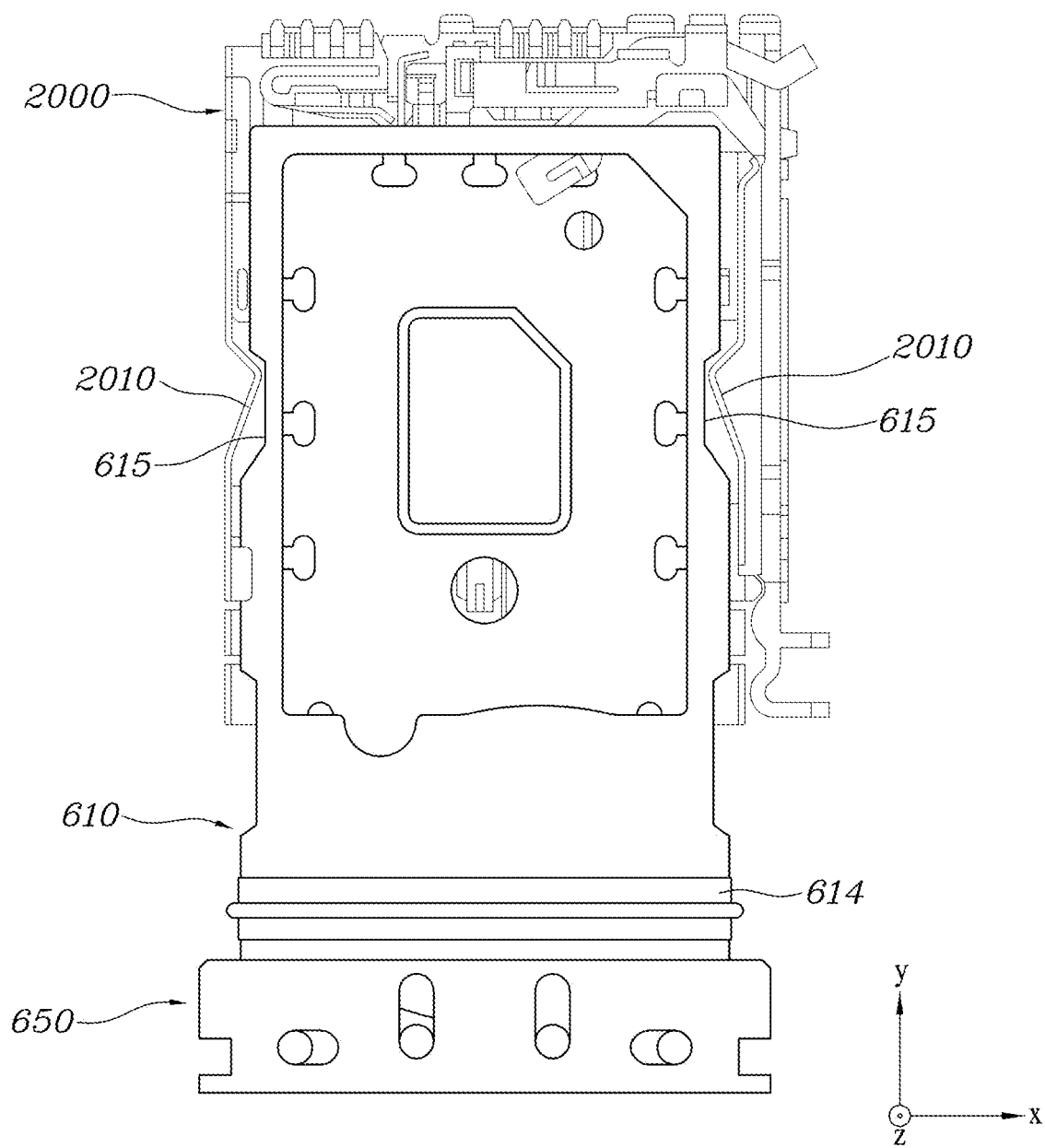
FIG. 20 is a view illustrating a state in which a tray is mounted in a socket of an electronic device according to an embodiment.

FIG. 20 is a view illustrating a state in which the tray according to an embodiment is mounted in a socket of the electronic device.

Figure 21:
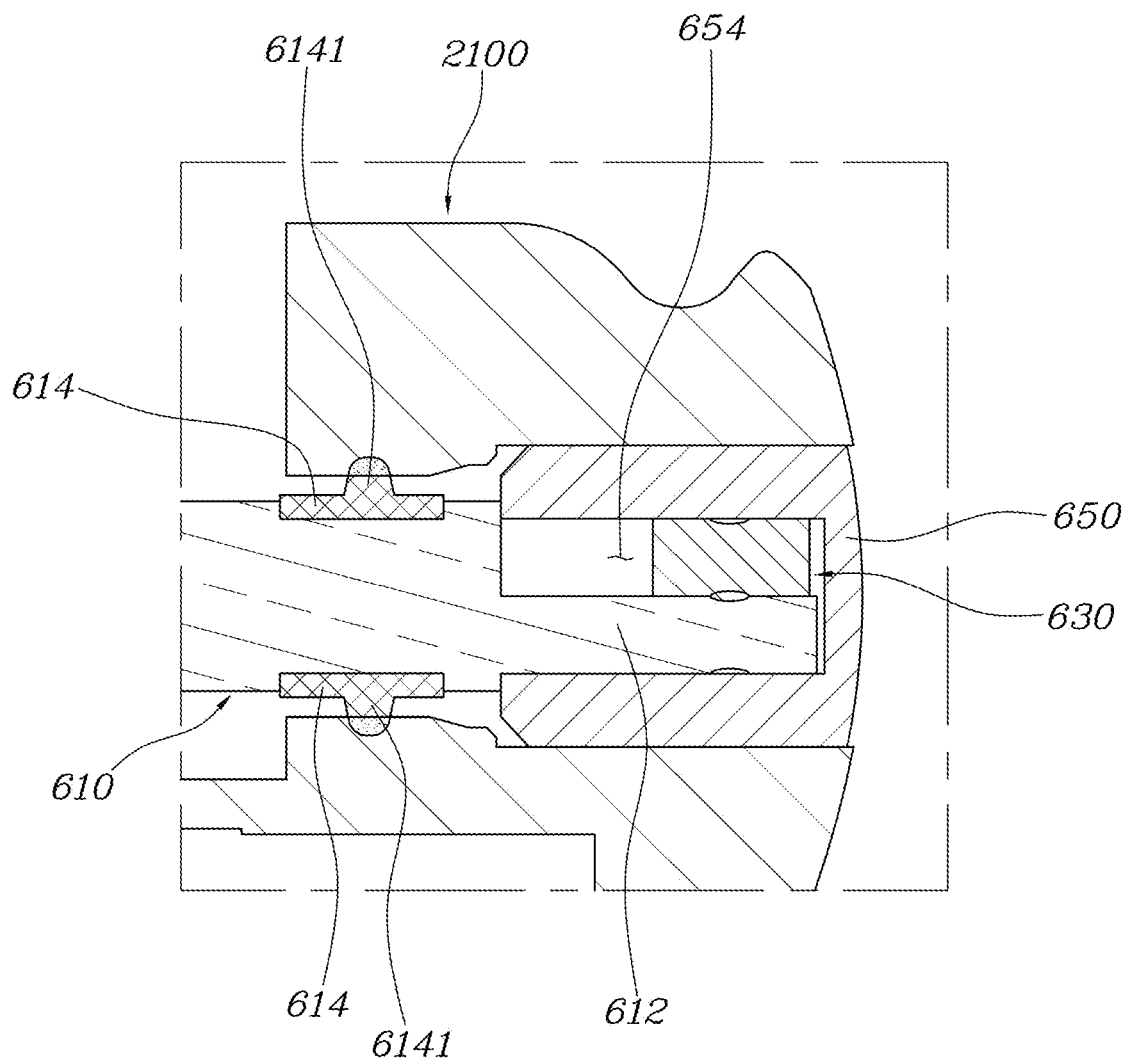
FIG. 21 is a partial cross-sectional view illustrating coupling relationship between a tray and a housing when the tray is mounted in an electronic device according to an embodiment.

FIG. 21 is a partial cross-sectional view for explaining the coupling relationship between the tray and the housing when the tray is mounted onto the electronic device according to an embodiment.

Referring to FIG. 20, in order to explain the coupling relationship between the tray 600 and the socket 2000, an upper part of the socket 2000 is omitted from illustration for convenience of description. In the description of FIGS. 20 and 21, reference numerals may be omitted for any components that can be easily understood from the preceding drawings, and their detailed descriptions may also be omitted.

According to an embodiment, the socket 2000 may include a fixing member 2010. The fixing member 2010 may be, for example, arranged to fix the movement of the tray 600. The fixing member 2010 may be made of an elastic material. The fixing member 2010 may have a shape of leaf spring, but is not limited thereto. When the tray 600 is mounted onto the socket 2000, it may be fixed by the fixing member 2010.

According to an embodiment, the tray 600 may include a body fixing groove 615 and a waterproof member 614. The body fixing groove 615, which is a groove formed in a side 610a of the tray body 610, may be a portion in which the fixing member 2010 of the socket 2000 is seated when the tray 600 is mounted onto the socket 2000. The body fixing groove 615 may be arranged, for example, in a position corresponding to the fixing member 2010 of the socket 2000. The waterproof member 614 may be arranged, for example, so that the tray body 610 is in close contact with an opening of a housing 2100. Specifically, a waterproof protrusion 6141 of the waterproof member 614 may be in close contact with the housing 2100. The waterproof member 614 may include an elastic material. The waterproof member 614 may provide a frictional force so as to reduce an inflow of external water into the inside of the tray body 610 as well as reduce occurrence of removal of the tray body 610 against the user's intention.

Figure 22:
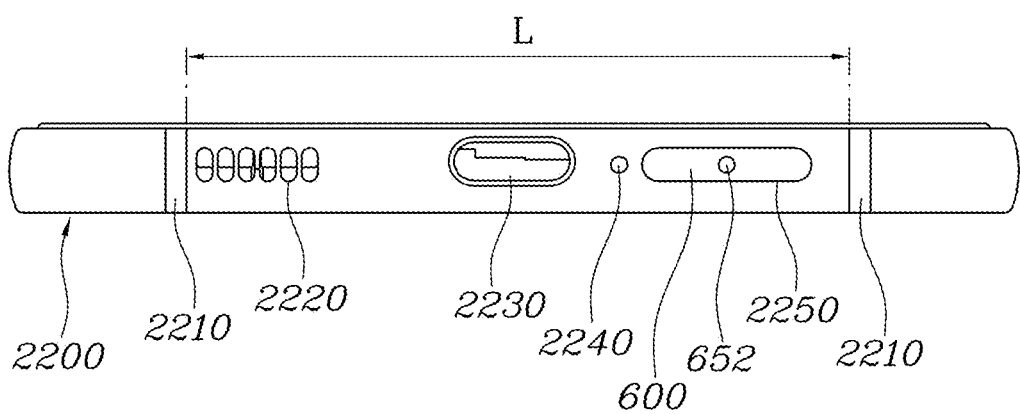
FIG. 22 is a side view of one side of an electronic device according to another embodiment.

FIG. 22 is a side view of one side of an electronic device according to an embodiment.

Referring to FIG. 22, according to an embodiment, a speaker hole 2220, a connector hole 2230, a microphone hole 2240, or a tray hole 2250 may be arranged on one side of a housing 2200. The speaker hole 2220, the connector hole 2230, or the microphone hole 2240 of FIG. 22 may correspond to the speaker hole 207, the connector hole 208, or the microphone hole 203 of the electronic device 200 of FIG. 2A, and thus, their description will be omitted. Further, the tray hole 2250 of FIG. 22 may correspond to the opening 412 of the electronic device 400 of FIG. 4, and thus its description will be also omitted.

According to an embodiment, at least one segmented part 2210 may be arranged in the housing 2200. The segmented part 2210 may form, for example, a part of one side of the housing 2200. According to an embodiment, a frequency range of an antenna may be adjusted by changing a segment length L between the two segmented parts 2210. However, as shown in the drawing, when components, such as e.g., the speaker hole 2220, the connector hole 2230, the microphone hole 2240, or the tray hole 2250, are arranged in between the two segmented parts 2210, there may be a considerable limit in reducing the segment length L between the two segmented parts 2210. In the case of the disclosure, since the eject hole 652 can be provided without expansion of the tray head 650, it is also possible to reduce the tray head 650. As a result, it is possible to further reduce the segment length L between the two segmented parts 2210 by as much as the reduced length of the tray head 650, thereby providing an antenna with a wider bandwidth.

Figure 23:
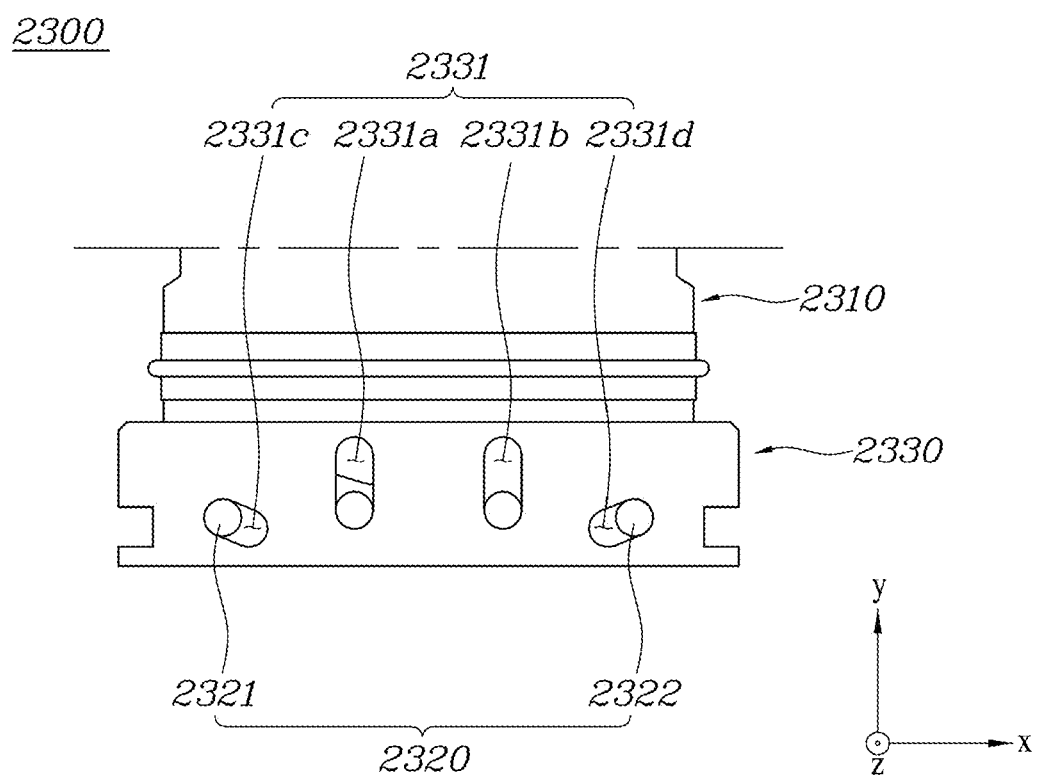
FIGS. 23 and 24 are plan views of a tray according to a first embodiment among various embodiments.
Figure 24:
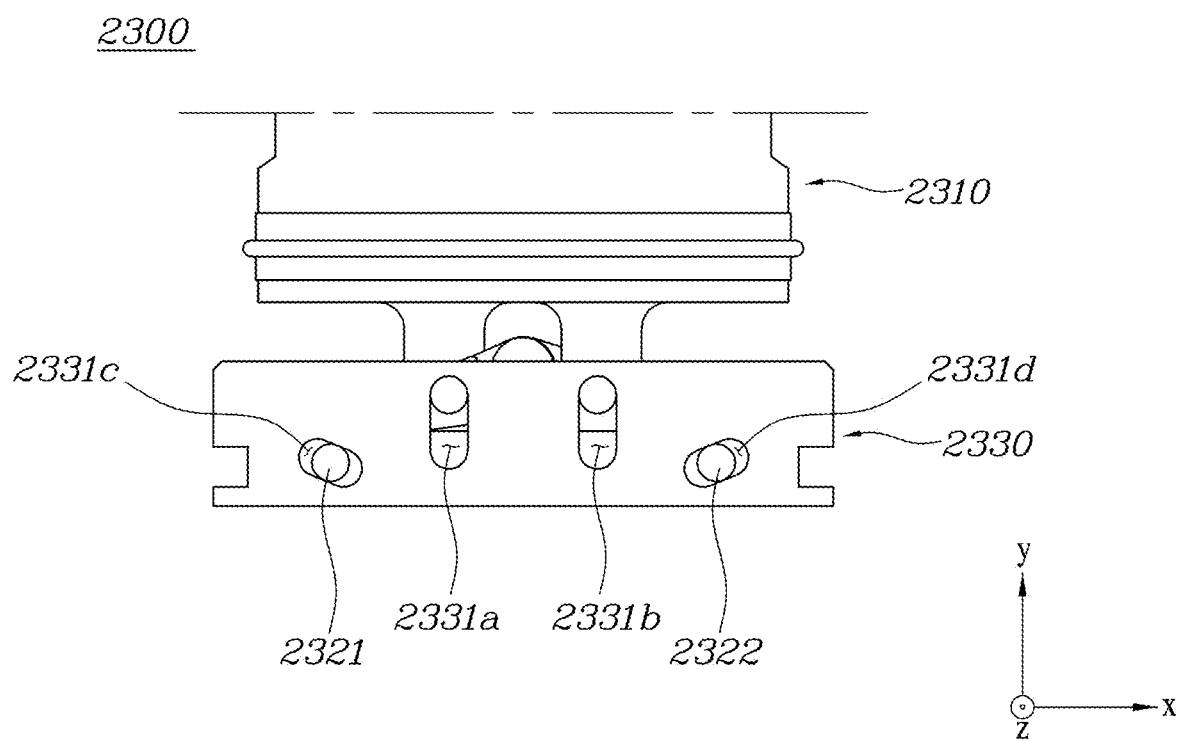

FIGS. 23 and 24 are plan views of a tray according to a first embodiment amongst various embodiments. In describing this embodiment, reference numerals in the drawings may be omitted for any components similar to and/or easily understood through the preceding embodiments, and their detailed descriptions may also be omitted.

Referring to FIGS. 23 and 24, the tray 2300 according to the first embodiment may include a tray body 2310, a lever assembly 2320 or a tray head 2330. The tray body 2310 or the lever assembly 2320 is the same as or similar to the tray body 610 or lever assembly 630 of the tray 600 as illustrated in FIGS. 6 to 21, and thus, description thereof will be omitted.

According to an embodiment, the tray head 2330 may include guide holes 2331. According to an embodiment, the guide holes 2331 may include a first guide hole 2331a, a second guide hole 2331b, a third guide hole 2331c, or a fourth guide hole 2331d. The role of the guide holes 2331 may be substantially the same as or similar to that of the guide hole 651 of the tray 600 described with reference to FIGS. 6 to 21. However, the guide holes 2331 shown above has the third guide hole 2331c and the fourth guide hole 2331d formed to extend obliquely in a diagonal direction, which is distinguished in shape from the guide hole 651 described in FIGS. 6 to 21.

According to an embodiment, the third guide hole 2331c or the fourth guide hole 2331d may extend in an oblique direction inclined toward the front side (e.g., −y-axis direction) of the tray body 2310 as it goes further toward the inner side (e.g., its middle or center side) of the tray body 2310. As the third guide hole 2331c and the fourth guide hole 2331d extend in the oblique direction, when the lever assembly 2320 is rotated to press the tray head 2330, the first push pin 2321 and the second push pin 2322 can move more smoothly.

Figure 25:
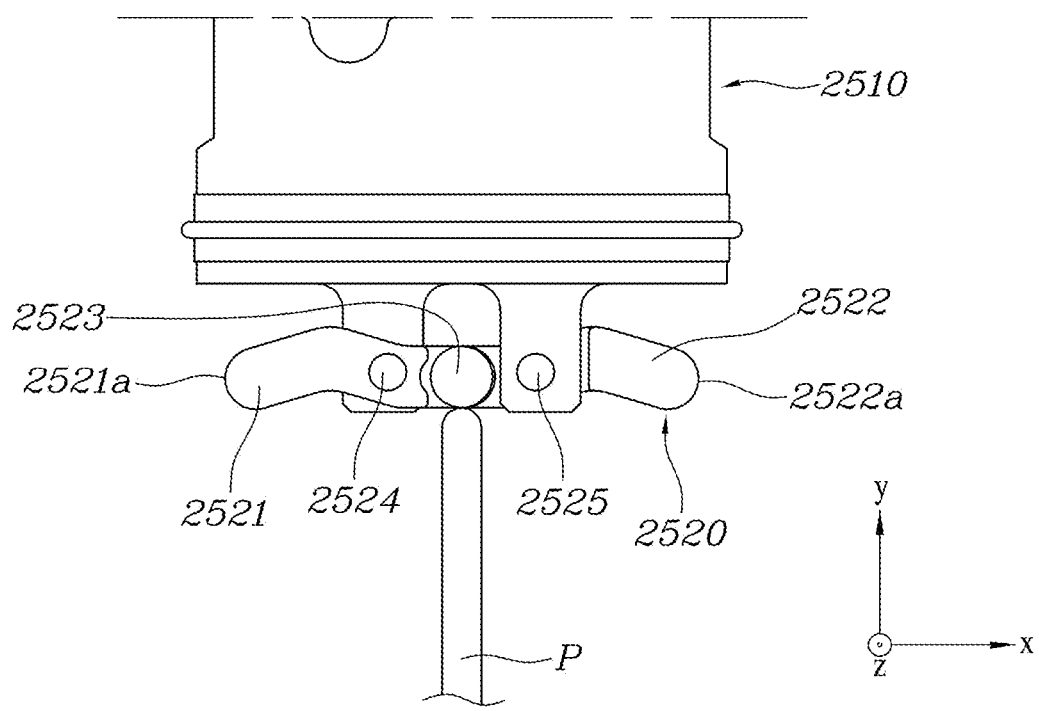
FIGS. 25 and 26 are plan views of a tray according to a second embodiment among various embodiments.
Figure 26:
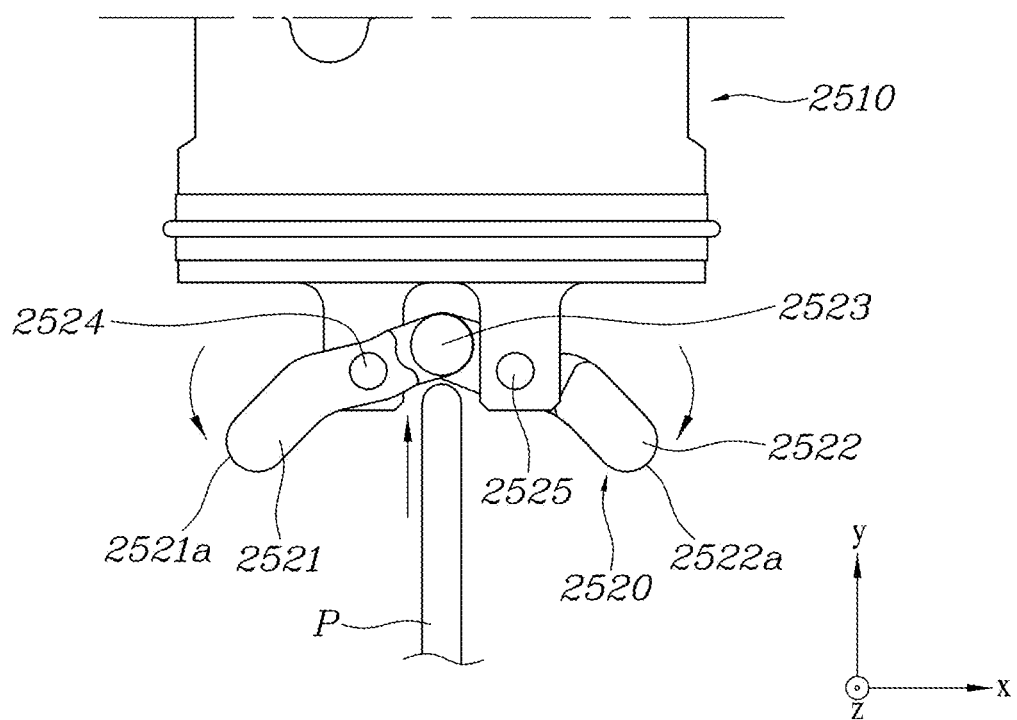

FIGS. 25 and 26 are plan views of a tray according to a second embodiment of various embodiments. In describing this embodiment, reference numerals in the drawings may be omitted for any components similar to and/or easily understood through the preceding embodiments, and their detailed descriptions may also be omitted.

Referring to FIGS. 25 and 26, the tray 2500 according to the second embodiment may include a tray body 2510, a lever assembly 2520, or a tray head (not shown). Since the illustrated tray body 2510 is the same as or similar to the tray body 610 of the tray 600 illustrated with reference to FIGS. 6 to 21, its detailed description will be omitted.

According to an embodiment, the lever assembly 2520 may include a first lever 2521 and a second lever 2522, a coupling pin 2523 for coupling the first lever 2521 and the second lever 2522, a first rotation axis pin 2524 for fixing the first lever 2521 to the tray body 2510, or a second rotation axis pin 2525 for fixing the second lever 2522 to the tray body 2510. Compared with the tray 600 shown in FIGS. 6 to 21, the configuration of the first push pin (e.g., the first push pin 636 of FIG. 6) and the second push pin (e.g., the second push pin 637 of FIG. 6) may be omitted from the tray 2500 according to the second embodiment. As such, the first push hole (e.g., the first push hole 6313 of FIG. 10) may be also omitted from the first lever 2521 and the second push hole (e.g., the second push hole 6323 of FIG. 10) may be also omitted from the second lever 2522.

The tray 2500 according to the second embodiment can draw out the tray head by pushing the tray head (not shown) by the other end 2521a of the first lever 2521 and the other end 2522a of the second lever 2522 other than the push pin.

According to an embodiment, the tray head may have a shape in which the third guide hole 6513 and the fourth guide hole 6514 are omitted from the configuration of the tray head 650 of FIGS. 6 to 21.

Hereinafter, FIGS. 27 to 34 are views for explaining various embodiments of a tray to which a lever assembly of a single lever is applied.

FIGS. 27 to 30 are plan views of a tray according to a third embodiment among various embodiments of the disclosure.

Figure 27:
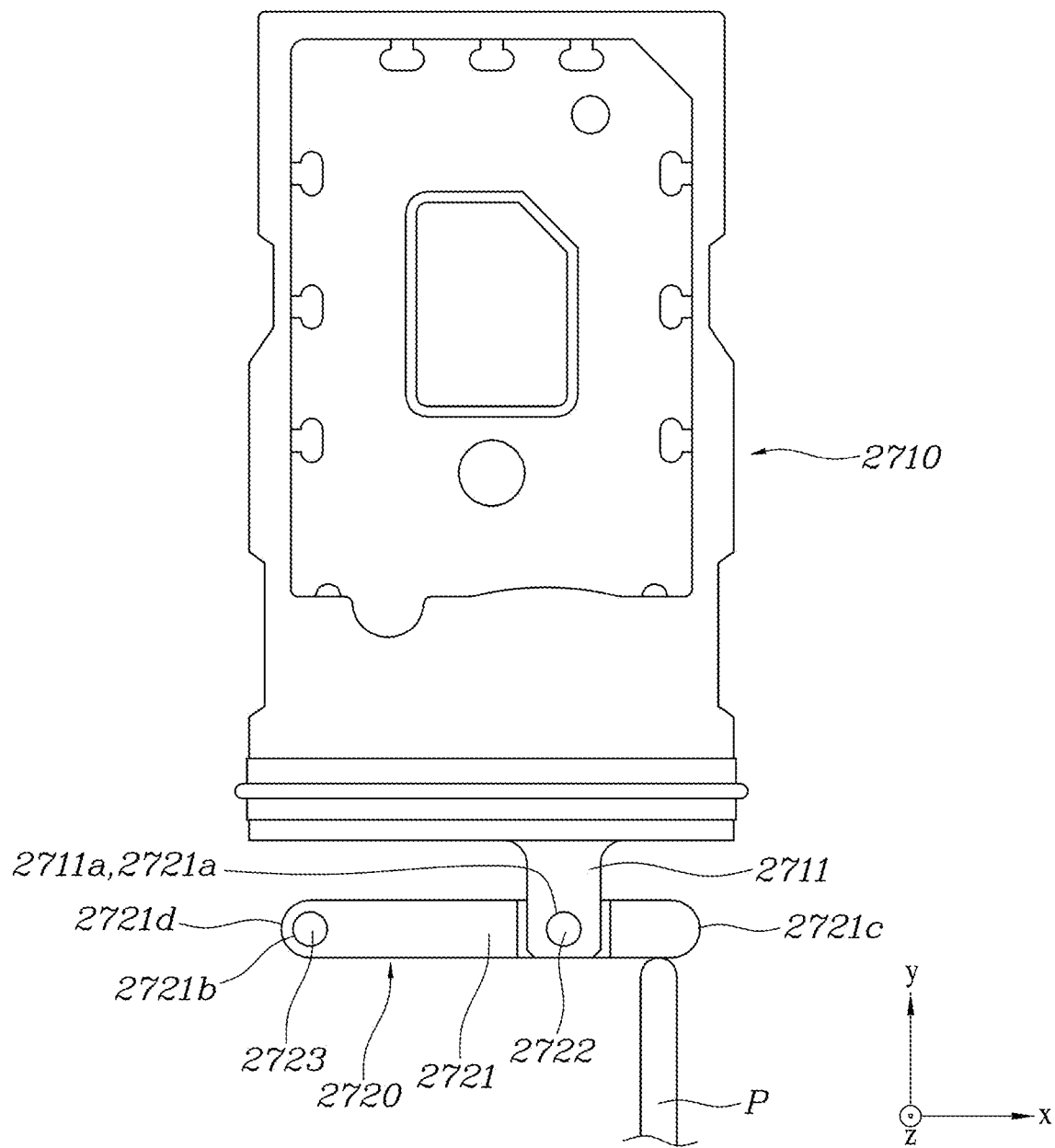
FIGS. 27, 28, 29, and 30 are plan views of a tray according to according to various embodiments of the disclosure.
Figure 28:
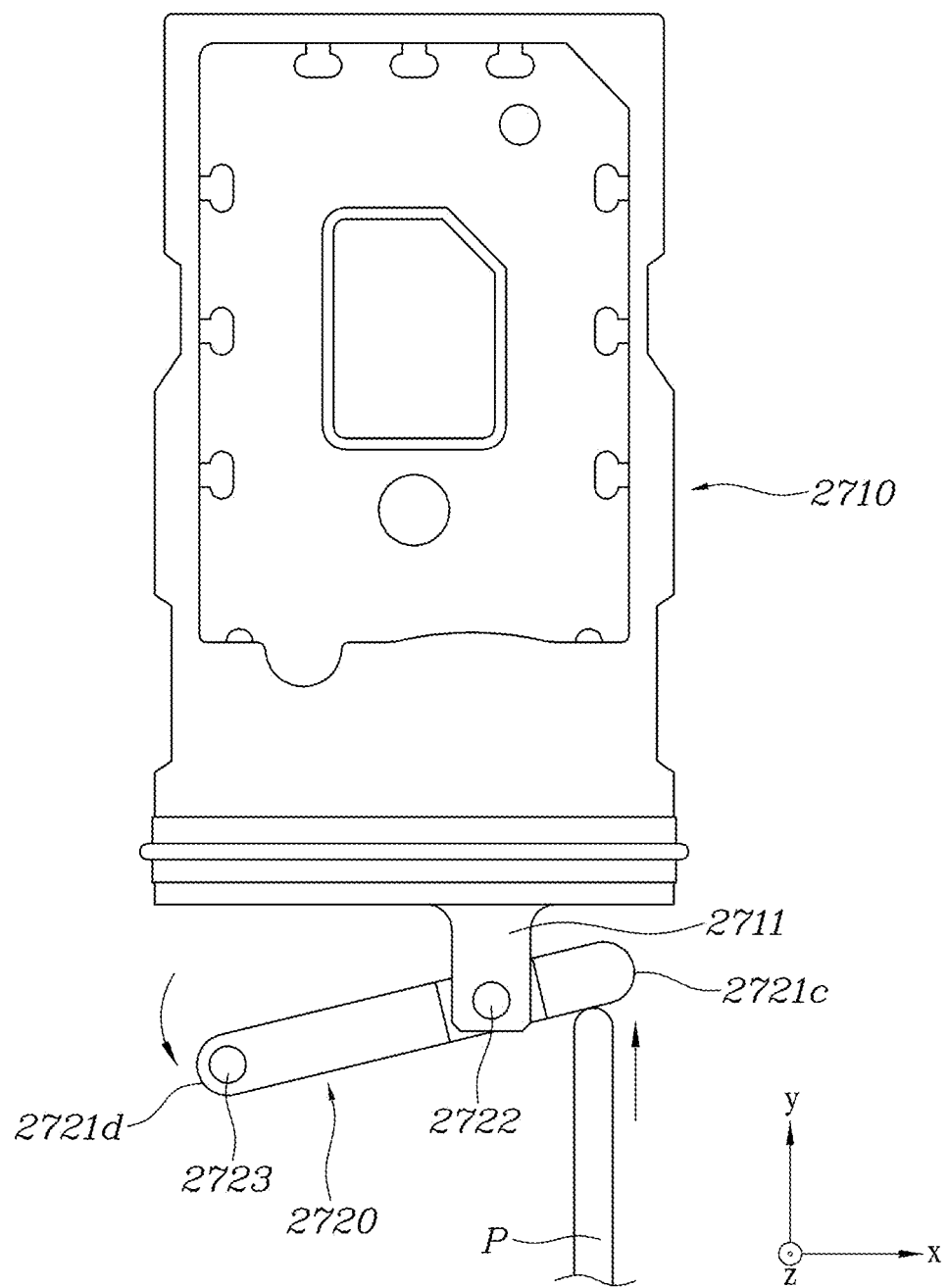
Figure 29:
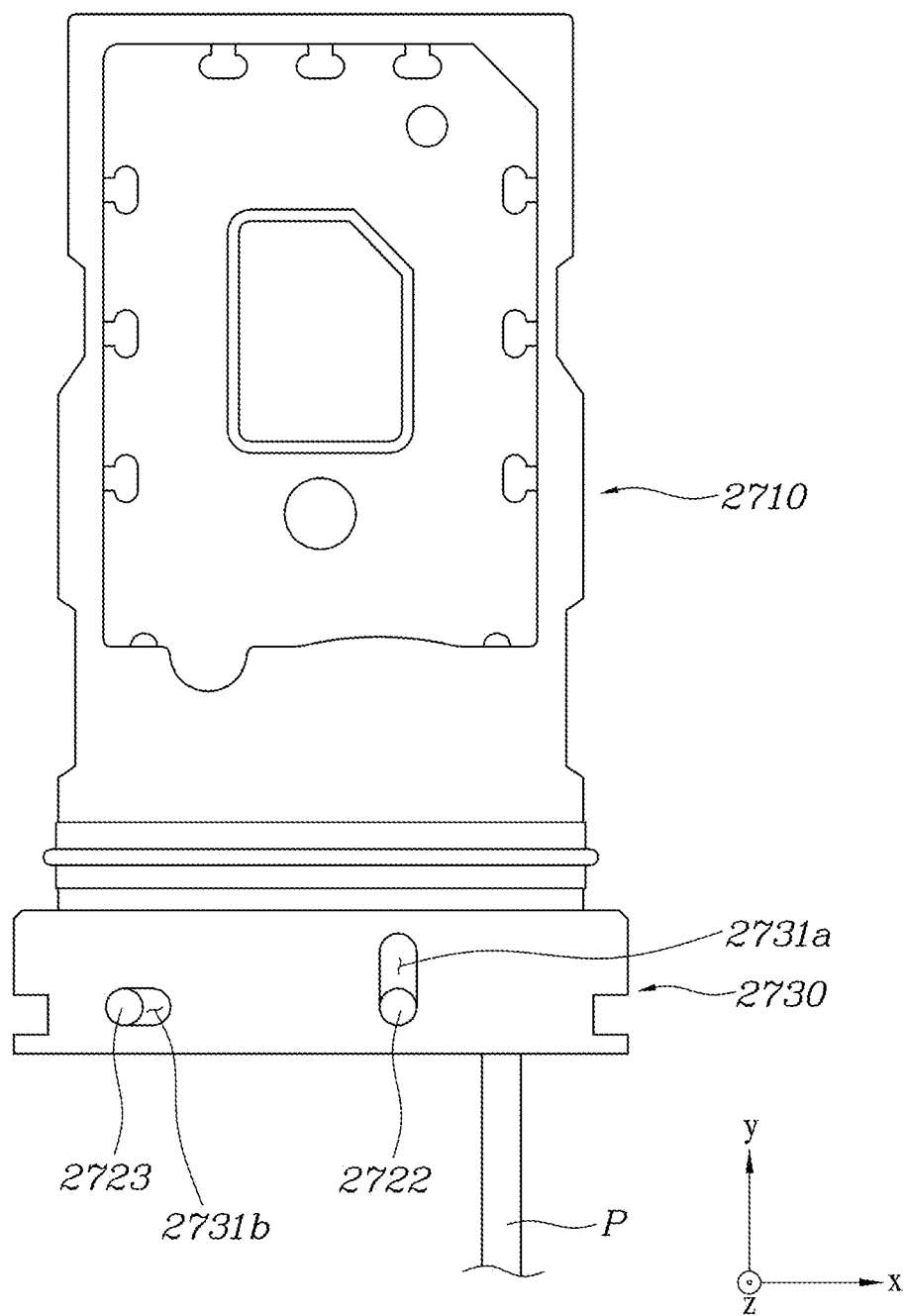
Figure 30:
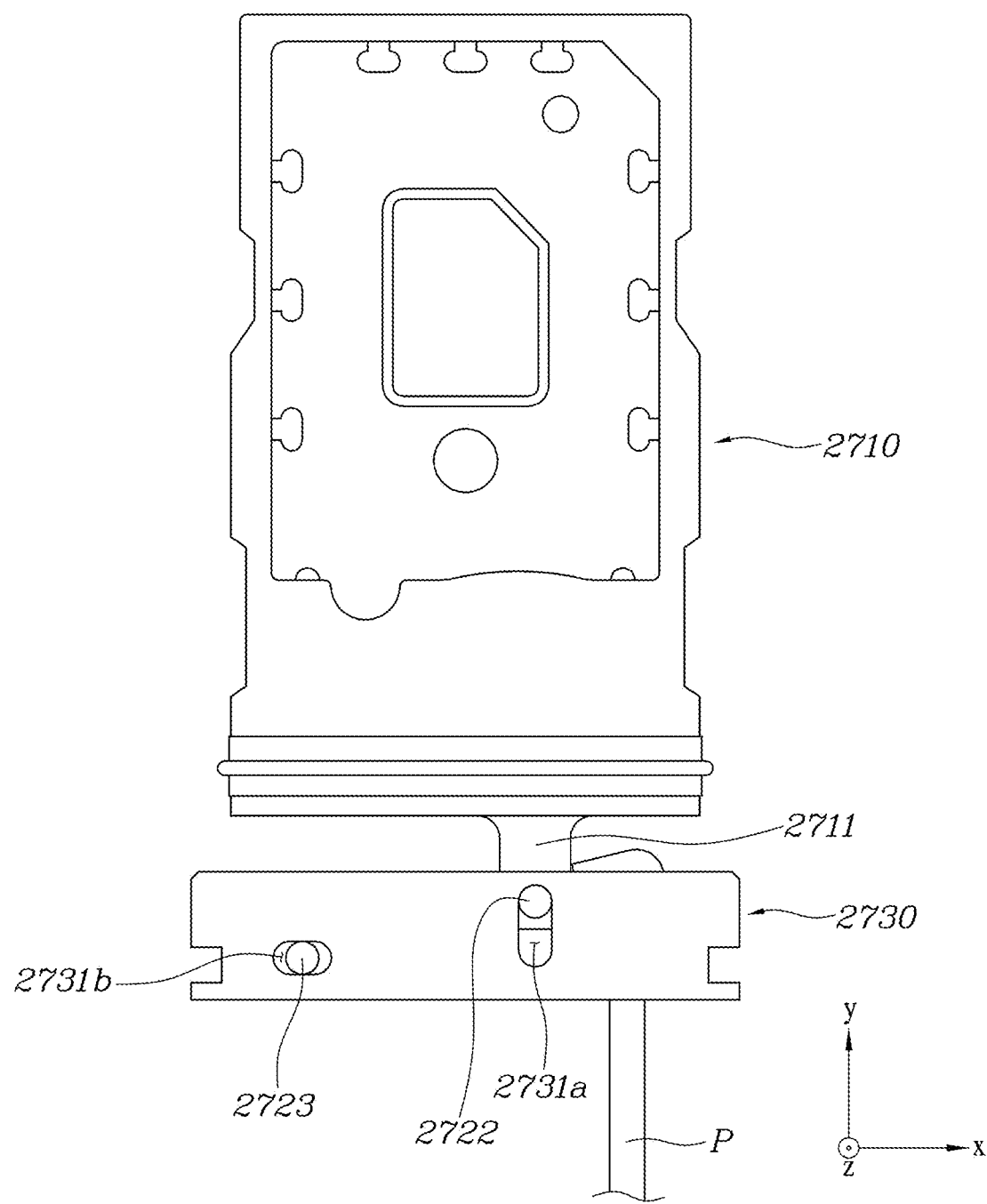

FIGS. 27 and 28 are for explaining the operation of the lever assembly mounted on the tray according to the third embodiment, and FIGS. 29 and 30 are for explaining movement of the tray head according to the operation of the lever assembly according to the third embodiment. Further, in describing the embodiments, reference numerals in the drawings may be omitted for any components similar to and/or easily understood through the preceding embodiments, and their detailed descriptions may also be omitted.

Referring to FIGS. 27, 28, 29 and 30, the tray 2700 according to the third embodiment may include a tray body 2710, a lever assembly 2720 or a tray head 2730.

According to an embodiment, the tray body 2710 may include a support 2711 extending in a direction toward the tray head 2730 (e.g., −y-axis direction). A body coupling hole 2711a for fixing and coupling the lever assembly 2720 may be formed at a free end of the support 2711.

According to an embodiment, the lever assembly 2720 may include a lever 2721, a rotation axis pin 2722, or a push pin 2723. According to an embodiment, the lever 2721 may include a rotation axis hole 2721a or a push hole 2721b. The lever 2721 may be coupled to the tray body 2710 by the rotation axis pin 2722 passing through the rotation axis hole 2721a and the body coupling hole 2711a. The push pin 2723 may pass through the push hole 2721b of the lever 2721.

According to an embodiment, the tray head 2730 may include a guide hole 2731 on at least one of its upper surface or its lower surface. According to an embodiment, the guide hole 2731 may include a first guide hole 2731a coupled to the rotation axis pin 2722 and a second guide hole 2731b coupled to the push pin 2723.

According to an embodiment, when one end 2721c of the lever 2721 is pressed by an external member, the push pin 2723 located at the other end 2721d of the lever 2721 may press the tray head 2730 to draw out the tray head 2730.

Figure 31:
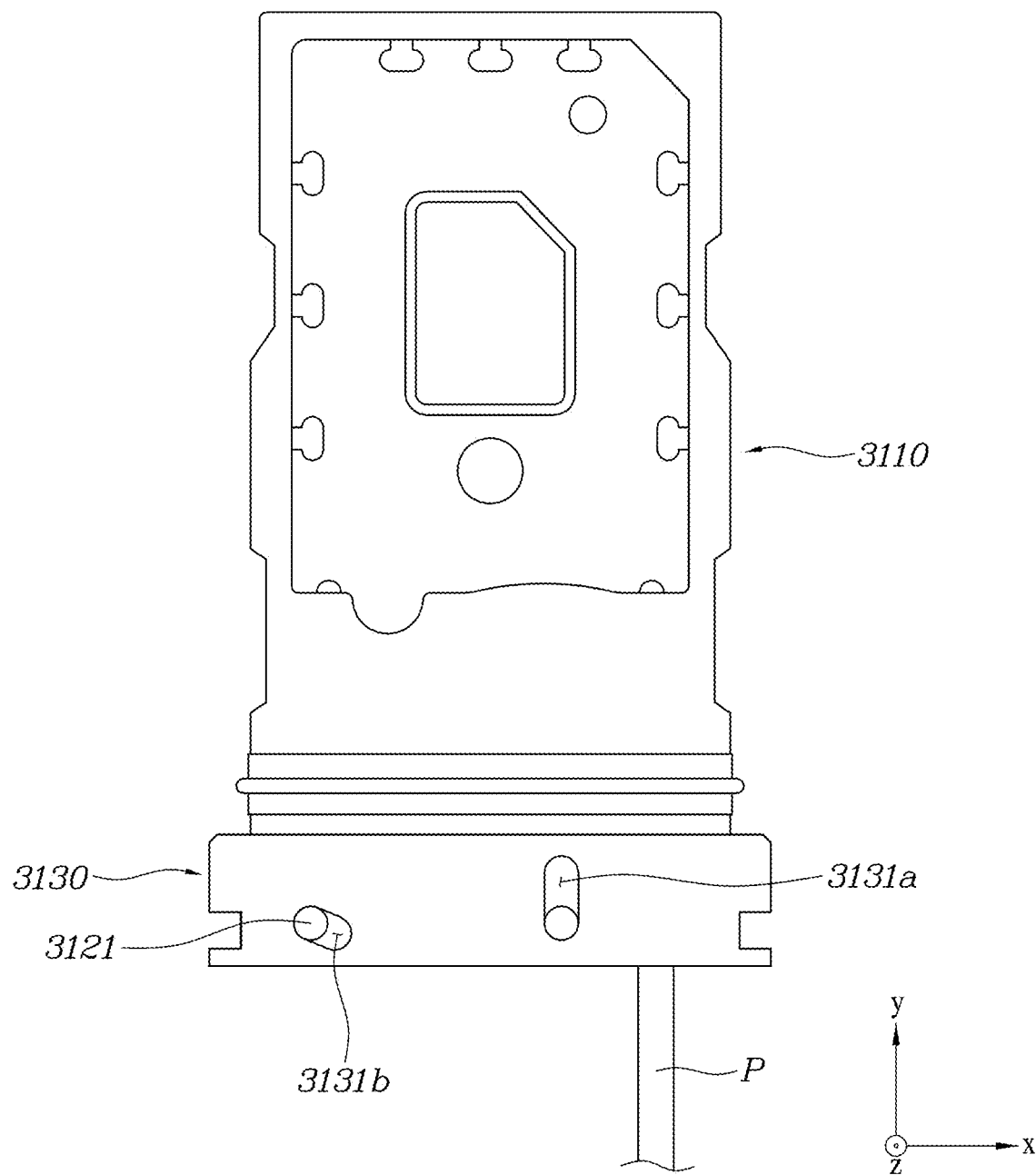
FIGS. 31 and 32 are plan views of a tray according to various embodiments of the disclosure.
Figure 32:
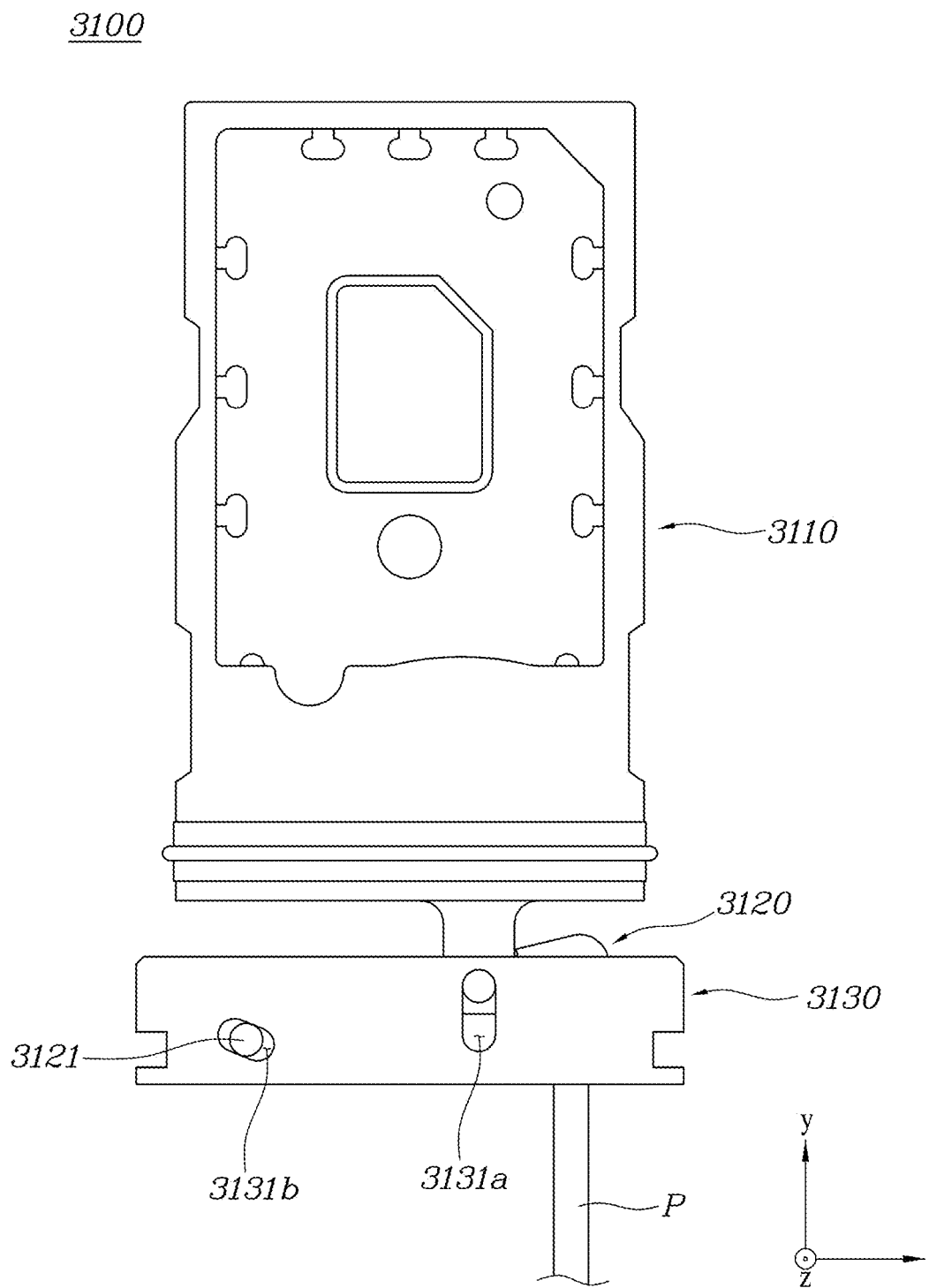

FIGS. 31 and 32 are plan views of a tray according to a fourth embodiment of various embodiments. In describing this embodiment, some reference numerals in the drawings may be omitted for any components similar to and/or easily understood through the preceding embodiments, and their detailed descriptions may also be omitted.

Referring to FIGS. 31 and 32, the tray 3100 according to the fourth embodiment may include a tray body 3110, a lever assembly 3120, or a tray head 3130. The tray body 3110 or the lever assembly 3120 may be substantially the same as or similar to the tray body 2710 or the lever assembly 2720 of the tray 2700 illustrated in FIGS. 27 to 30, and thus the description thereof will be omitted.

According to an embodiment, the tray head 3130 may include a guide hole 3131. According to another embodiment, the guide hole 3131 may include a first guide hole 3131a or a second guide hole 3131b. The role of the guide hole 3131 may be mostly the same as or similar to that of the guide holes 651 and 2731 described with reference to FIGS. 6 to 21 and 27 to 30. However, the guide hole 3131 described above may be different from the guide hole 651 and 2731 described in FIGS. 6 to 21 and 27 to 30 in that the second guide hole 3131b extends slantwise in a diagonal direction.

According to another embodiment, the second guide hole 3131b may extend in the oblique direction more inclined toward the front side of the tray body 3110 (e.g., −y-axis) direction), as it goes further toward the inner side (e.g., its middle or center side) of the tray body 3110. As the second guide hole 3131b extends in such an oblique direction, the push pin 3121 may move more smoothly when the lever assembly 3120 is rotated to press the tray head 3130.

Figure 33:
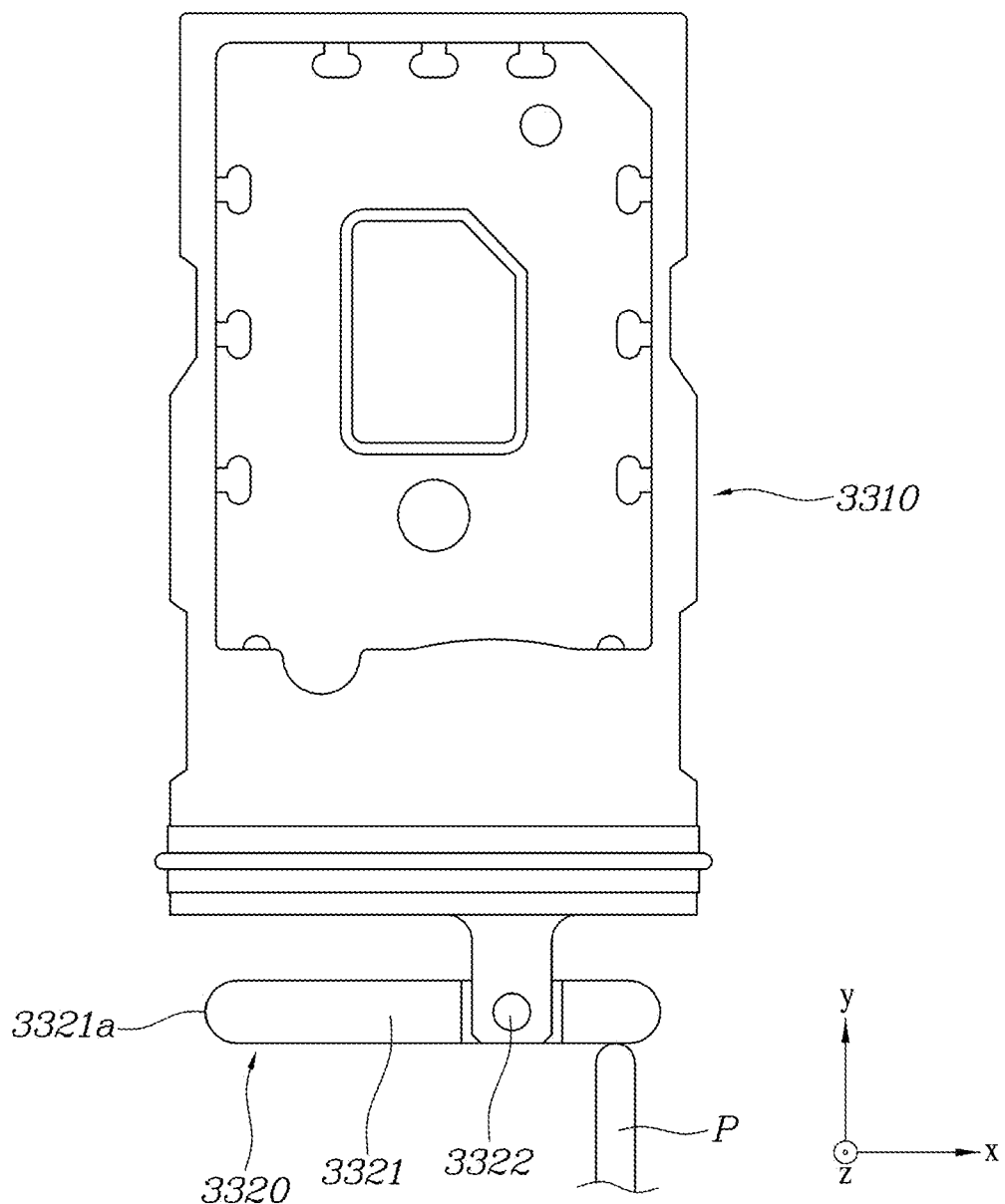
FIGS. 33 and 34 are plan views of a tray according to various embodiments of the disclosure.
Figure 34:
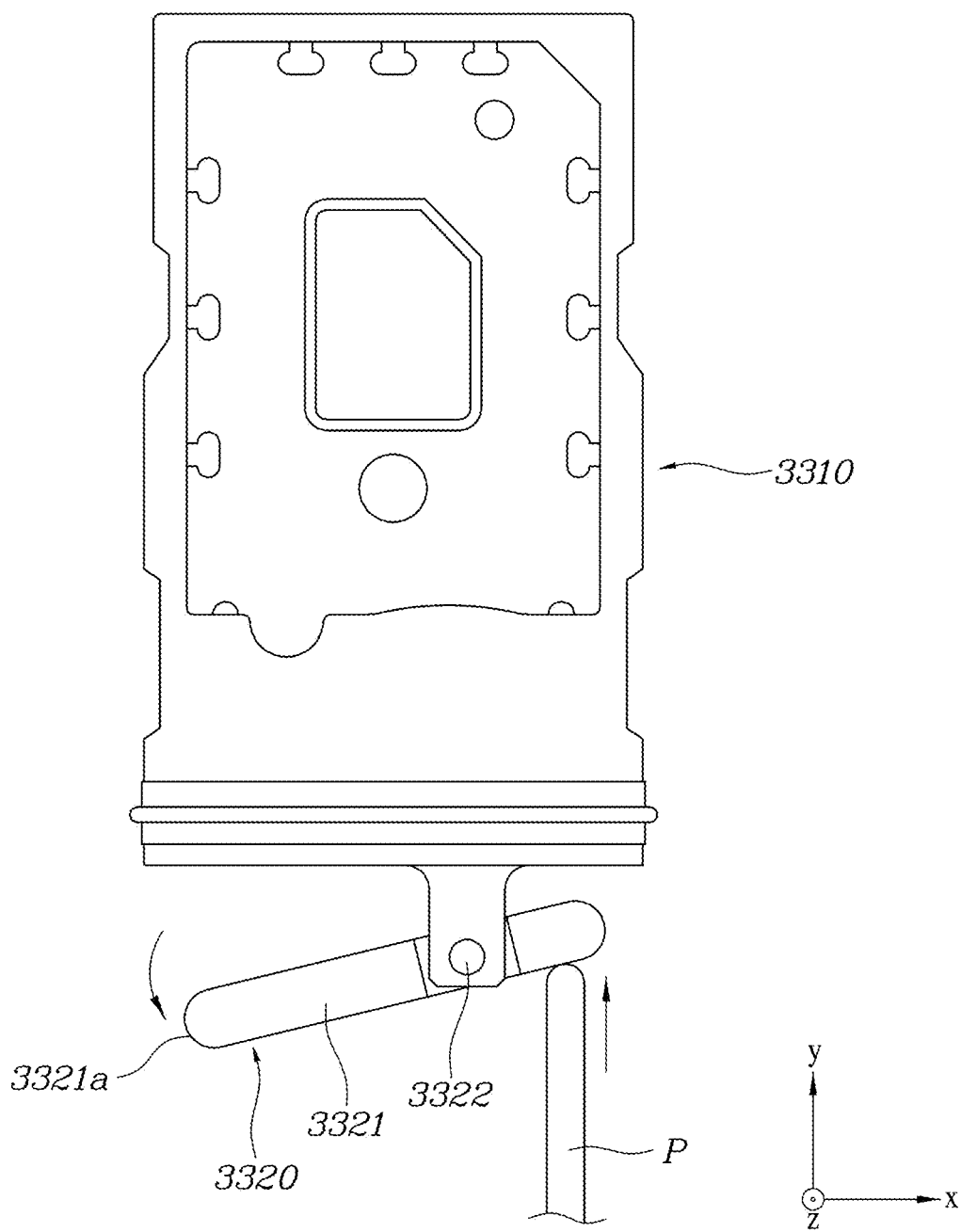

FIGS. 33 and 34 are plan views of a tray according to a fifth embodiment amongst various embodiments of the disclosure. In describing the embodiment, the same or similar reference numerals may be assigned or omitted for any components similar to and/or easily understood through the preceding embodiments, and their detailed descriptions may be also omitted Referring to FIGS. 33 and 34, the tray 3300 according to the fifth embodiment may include a tray body 3310, a lever assembly 3320 or a tray head (not shown). Since the illustrated tray body 3310 is substantially the same as or similar to the tray body 2710 of the tray 2700 illustrated in FIGS. 27 to 30, the description thereof will be omitted.

According to an embodiment, the lever assembly 3320 may include a lever 3321 or a rotation axis pin 3322 for fixing the lever 3321 to the tray body 3310. Compared to the tray 2700 shown in FIGS. 27 to 30, the configuration of the push pin (e.g., the push pin 2723 of FIG. 27) may be omitted from the tray 3300 according to the fifth embodiment, and thus, the push hole (e.g., the push hole 2721b of FIG. 27) may also be omitted from the lever 3321.

The tray 3300 according to the fifth embodiment may draw out the tray head by allowing the other end 3321a of the lever 3321 other than the push pin to push the front surface of the tray head (not shown).

According to an embodiment, the tray head may have a shape in which the second guide hole 2731b is omitted from the configuration of the tray head 2730 of FIGS. 27 to 30.

The various embodiments and terms used herein are not intended to limit the technical features described herein to specific embodiments and should be understood to include various modifications, equivalents, or substitutes of the embodiment. In connection with the description of the drawings, like reference numerals may be used for similar or related components. The singular form of a noun corresponding to an item may include one or more of the item, unless the relevant context clearly dictates otherwise. In this document, each of the phrases such as "A or B", "at least one of A and B", "at least one of A or B", "A, B or C", "at least one of A, B and C", and "at least one of A, B, or C" may include any one of the items enumerated together in a corresponding one of the phrases, or all possible combinations thereof. Terms such as "the first", "the second", or "first", or "second" may be used simply to distinguish a corresponding component from another corresponding component, and do not limit the corresponding components in view of other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" used in various embodiments of the disclosure may include a unit implemented in hardware, software, or firmware and be used interchangeably with terms such as e.g., logic, logic block, part, component, or circuitry, for example. The module or unit may be a minimum unit or a part of the integrally configured component or the component that performs one or more functions. For example, according to an embodiment, the module or unit may be implemented in the form of an application-specific integrated circuit (ASIC).

Various embodiments of the disclosure are stored in a storage medium (e.g., the internal memory 136 or the external memory 138) readable by a machine (e.g., the electronic device 101). It may be implemented as software (e.g., program 140) including one or more instructions. For example, the processor (e.g., the processor 120) of the device (e.g., the electronic device 101) may call at least one of one or more instructions stored from a storage medium and execute it. This makes it possible for the device to be operated to perform at least one function according to the called at least one command. The one or more instructions may include code generated by a compiler or code executable by an interpreter. The device-readable storage medium may be provided in the form of a non-transitory storage medium. Here, 'non-transitory' only means that the storage medium is a tangible device and does not contain a signal (e.g., electromagnetic wave), and this term refers to the case where data is semi-permanently stored in the storage medium and it does not distinguish between temporary storage cases.

According to an embodiment of the disclosure, an electronic device (e.g., an electronic device 200 of FIG. 2A) comprises a housing (e.g., a housing 210 of FIG. 2A) including an opening in a side thereof; a tray (e.g., a tray 600 of FIG. 6 including a tray body (e.g., a tray body 610 of FIG. 6), a lever assembly (e.g., a lever assembly 630 of FIG. 6) arranged to have a rotation axis fixed to the tray body, and a tray head (e.g., a tray head 650 of FIG. 6) arranged to be coupled to the lever assembly, the tray being arranged to be mounted through the opening; and a socket (e.g., a socket 2000 of FIG. 20) arranged in the housing to receive at least a portion of the tray introduced into the opening of the housing, wherein at least a portion of the tray head may be configured to protrude out of the opening by movement of the lever assembly with respect to the rotation axis.

According to an embodiment of the disclosure, the tray body may comprise a support (e.g., a first support 612 or a second support 613 of FIG. 6) protruding in a direction toward the tray head and forming a coupling hole (e.g., a first body coupling hole 6121 or a second body coupling hole 6131 of FIG. 6) at a free end thereof, wherein the rotation axis of the lever assembly may be located at a position corresponding to the coupling hole.

According to an embodiment of the disclosure, the lever assembly may comprise a lever (e.g., a first lever 631 and a second lever 632) including a rotation axis hole; and a first rotation axis pin (e.g., a first rotation axis pin 634 of FIG. 6) arranged to pass through the tray body and the rotation axis hole.

According to an embodiment of the disclosure, the tray head may further comprise, on at least one of an upper surface or a lower surface thereof, a guide hole (e.g., a first guide hole 6511 of FIG. 6) for guiding movement of the first rotation axis pin with respect to the tray head while moving with respect to the tray body.

According to an embodiment of the disclosure, the lever assembly may comprise a first lever (e.g., a first lever 631 of FIG. 6) including a first rotation axis hole (e.g., a first rotation axis hole 6311 of FIG. 6) and a first coupling hole (e.g., a first coupling hole 6312 of FIG. 6) disposed at one end; a second lever (e.g., a second lever 632 of FIG. 6) including a second rotation axis hole (e.g., a second rotation axis hole 6321 of FIG. 6) and a second coupling hole (e.g., a second coupling hole 6322 of FIG. 6) disposed at one end; a coupling pin (e.g., a coupling pin 633 of FIG. 6) arranged so that one end of the first lever and one end of the second lever at least partially overlap to pass through the first coupling hole and the second coupling hole; a first rotation axis pin (e.g., a first rotation axis pin 634 of FIG. 6) arranged to pass through a portion of the tray body and the first rotation axis hole; and a second rotation axis pin (e.g., a second rotation axis pin 635 of FIG. 6) arranged to pass through a portion of the tray body and the second rotation axis hole.

According to an embodiment of the disclosure, the tray head may further comprise, on at least one of an upper surface or a lower surface thereof, a first guide hole (e.g., a first guide hole 6511 of FIG. 6) and a second guide hole (e.g., a second guide hole 6512 of FIG. 6) for guiding movement of the first rotation axis pin and the second rotation axis pin with respect to the tray body while moving relative to tray body.

According to an embodiment of the disclosure, the first lever further comprises a first push hole (e.g., a first push hole 6313 of FIG. 10) arranged to be passed through by a first push pin at the other end, and the second lever further comprises a second push hole (e.g., a second push hole 6323 of FIG. 10) arranged to be passed through by a second push pin (e.g., a second push pin 637 of FIG. 6) at the other end, wherein the tray head further comprises, on at least one of an upper surface and a lower surface thereof, a third guide hole (e.g., a third guide hole 6513 of FIG. 6) and a fourth guide hole (e.g., a fourth guide hole 6514 of FIG. 6) for guiding movement of the first push pin and movement of the second push pin with respect to the tray.

According to an embodiment of the disclosure, the third guide hole and the fourth guide hole may be configured to extend in a direction parallel to a front surface of the tray body.

According to an embodiment of the disclosure, the third guide hole and the fourth guide hole may be configured to extend in an oblique direction inclined toward the front surface of the tray body as it goes further toward an inner side of the tray body.

According to an embodiment of the disclosure, the tray head may further comprise an eject hole (e.g., an eject hole 652 of FIG. 6) arranged on the front surface so that an eject pin (e.g., an eject pin P of FIG. 6) is inserted to press a portion of the lever assembly to rotate the lever assembly with respect to the rotation axis.

According to an embodiment of the disclosure, the eject hole may be located at a position overlapping the tray body when the front surface of the tray head is viewed from an outside in a direction in which the tray is mounted on the housing.

According to an embodiment of the disclosure, when a force for pushing the tray head outward of the housing is applied by rotation of the lever assembly, the tray body is accommodated in the socket, and the tray head may protrude from the housing.

According to an embodiment of the disclosure, the socket may further comprise a fixing member (e.g., a fixing member 2010 of FIG. 20) for fixing movement of the tray.

According to an embodiment of the disclosure, the tray body may further comprise a waterproof member (e.g., a waterproof member 614 of FIG. 6) of an elastic material arranged to be in close contact with the opening of the housing.

According to an embodiment of the disclosure, the tray head may have a locking groove (e.g., a locking groove 653 in FIG. 6) formed on its side.

According to an embodiment of the disclosure, the tray head may be provided with a receiving space (e.g., a receiving space 654 of FIG. 6) for accommodating the lever assembly and a portion of the tray body.

According to an embodiment of the disclosure, a tray (e.g., a tray 600 of FIG. 6) mounted on an electronic device (e.g., an electronic device 200 of FIG. 2A) may comprise a tray body (e.g., a tray body 610 of FIG. 6) arranged to accommodate an external storage medium; a lever assembly (e.g., a lever assembly 630 of FIG. 6) including a first rotation axis hole (e.g., a first rotation axis hole 6311 of FIG. 6), and a first rotation axis pin (e.g., a first rotation axis pin 634 of FIG. 6) arranged to pass through a portion of the tray body and the first rotation axis hole, the lever assembly being arranged for the rotation axis to be fixed to the tray body by the first rotation axis pin; and a tray head (e.g., a tray head 650 of FIG. 6) coupled to the lever assembly to be movable with respect to the rotation axis.

According to an embodiment of the disclosure, the tray body may comprise a support (e.g., a first support 612 or a second support 613 of FIG. 6) protruding in a direction toward the tray head and forming a coupling hole (e.g., a first body coupling hole 6121 or a second body coupling hole 6131 of FIG. 6) at a free end thereof, wherein the rotation axis of the lever assembly may be located at a position corresponding to the coupling hole.

According to an embodiment of the disclosure, the first lever may comprise a first coupling hole (e.g., a first coupling hole 6312 of FIG. 6) disposed at one end, the lever assembly may comprise: a second lever (e.g., a second lever 632 of FIG. 6) including a second rotation axis hole (e.g., a second rotation axis hole 6321 of FIG. 6) and a second coupling hole (e.g., the second coupling hole 6322 of FIG. 6) disposed at one end; a coupling pin (e.g., a coupling pin 633 of FIG. 6) arranged to pass through the first coupling hole and the second coupling hole so that one end of the first lever and one end of the second lever at least partially overlap; a first rotation axis pin (e.g., a first rotation axis pin 634 of FIG. 6) arranged to pass through a portion of the tray body and the first rotation axis hole; and a second rotation axis pin (e.g., a second rotation axis pin 635 of FIG. 6) arranged to pass through a portion of the tray body and the second rotation axis hole.

According to an embodiment of the disclosure, the tray head may be provided with a receiving space (e.g., a receiving space 654 of FIG. 6) for accommodating a portion of the lever assembly and the tray body.

According to an embodiment, the method according to various embodiments disclosed in this document may be provided by being included in a computer program product. Computer program products may be traded between sellers and buyers as commodities. The computer program product may be distributed in the form of a device-readable storage medium (e.g. compact disc read only memory (CD-ROM)), or may be distributed (e.g., downloaded or uploaded) by online via an application store (e.g., PlayStore™) or directly between two user devices (e.g., smartphones). In the case of online distribution, at least a portion of the computer program product may be temporarily stored or temporarily generated in a machine-readable storage medium such as a memory of a server of a manufacturer, a server of an application store, or a memory of a relay server.

According to various embodiments, each component (e.g., module or program) of the above-described components may include a singular or a plurality of entities, and some of the plurality of entities may be separated and placed into other components. According to various embodiments, one or more components or operations among the above-described corresponding components may be omitted, or one or more other components or operations may be added thereto. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly or heuristically, or one or more of the operations may be executed in a different order or omitted, or one or more other operations may be added thereto.

The expression 'configured to~' as used in the disclosure may be used interchangeably with, depending on the context, for example, 'suitable for~', 'having the ability to~', 'designed to~', 'modified to~', 'made to~', 'capable of~' or the like. The term 'configured to~' may not necessarily mean only 'specially designed to~' in hardware. Instead, in some situations, the expression 'a device configured to ~' may mean that the device is 'capable of ~' together with another device or component. For example, a phrase 'a device configured to perform A, B, and C' may imply a dedicated device for performing a corresponding operation or imply a general-purpose device capable of performing various operations including the corresponding operation.

Meanwhile, the terms 'upper', 'lower', and 'forward/backward direction' used in the disclosure are defined on the basis of the drawings, and the shape and the position of each component are not limited by these terms.

Although the foregoing description in the disclosure has been made with respect to specific embodiments, the disclosure is not limited to such specific embodiments, and it will be understood that it encompasses all various modifications, equivalents, and/or substitutes of various embodiments.

What is claimed is:

1. An electronic device comprising:
   a housing comprising an opening in a side of the housing;
   a tray comprising a tray body, a lever assembly arranged to have a rotation axis fixed to the tray body, and a tray head arranged to be coupled to the lever assembly, the tray being arranged to be mounted through the opening; and
   a socket in the housing to receive at least a first portion of the tray drawn-in into the opening in the housing,
   wherein at least a portion of the tray head is configured to protrude out of the opening by movement of the lever assembly with respect to the rotation axis,
   wherein the tray body comprises a pair of supports protruding in a direction toward the tray head, each support of the pair of supports includes a coupling hole at a free end of the support, and
   wherein each support of the pair of supports is differently offset from a long edge of the tray body closest to the tray head.

2. The electronic device of claim 1,
   wherein the rotation axis of the lever assembly is located at a position corresponding to the coupling hole.

3. The electronic device of claim 1, wherein the lever assembly comprises:
   a lever comprising a rotation axis hole; and
   a first rotation axis pin to pass through the tray body and the rotation axis hole.

4. The electronic device of claim 3, wherein the tray head further comprises, on at least one of an upper surface of the tray head or a lower surface of the tray head, a guide hole for guiding movement of the first rotation axis pin with respect to the tray head while moving with respect to the tray body.

5. The electronic device of claim 1, wherein the lever assembly comprises:
   a first lever comprising a first rotation axis hole and a first coupling hole disposed at one end;
   a second lever comprising a second rotation axis hole and a second coupling hole disposed at one end;
   a coupling pin arranged so that one end of the first lever and one end of the second lever at least partially overlap to pass through the first coupling hole and the second coupling hole;
   a first rotation axis pin arranged to pass through a second portion of the tray body and the first rotation axis hole; and
   a second rotation axis pin arranged to pass through a third portion of the tray body and the second rotation axis hole.

6. The electronic device of claim 5, wherein the tray head further comprises, on at least one of an upper surface of the tray head or a lower surface of the tray head, a first guide hole and a second guide hole for guiding movement of the first rotation axis pin and the second rotation axis pin with respect to the tray body while moving with respect to tray body.

7. The electronic device of claim 5,
   wherein the first lever further comprises a first push hole to be passed through by a first push pin at the other end of the first lever,
   wherein the second lever further comprises a second push hole to be passed through by a second push pin at the other end of the second lever, and
   wherein the tray head further comprises, on at least one of an upper surface of the tray head or a lower surface of the tray head, a third guide hole and a fourth guide hole for guiding movement of the first push pin and movement of the second push pin with respect to the tray.

8. The electronic device of claim 7, wherein the third guide hole and the fourth guide hole are configured to extend in a direction parallel to a front surface of the tray body.

9. The electronic device of claim 7, wherein the third guide hole and the fourth guide hole are configured to extend in an oblique direction inclined toward a front surface of the tray body as it goes further toward an inner side of the tray body.

10. The electronic device of claim 1, wherein the tray head further comprises an eject hole, the eject hole positioned on a front surface so that an eject pin is inserted to press a portion of the lever assembly to rotate the lever assembly with respect to the rotation axis.

11. The electronic device of claim 10, wherein the eject hole is located at a position overlapping the tray body when the front surface of the tray head is viewed from the outside in a direction in which the tray is mounted on the housing.

12. The electronic device of claim 1, wherein while a force for pushing the tray head outward of the housing is applied by rotation of the lever assembly, the tray body is accommodated in the socket and the tray head protrudes from the housing.

13. The electronic device of claim 1,
    wherein the socket further comprises a fixing member for fixing movement of the tray, and
    wherein the tray body further comprises a waterproof member of an elastic material to be in close contact with the opening of the housing.

14. The electronic device of claim 1,
    wherein the tray head comprises a locking groove formed on a side of the tray head, and
    wherein the tray head comprises a receiving space for accommodating the lever assembly and a fourth portion of the tray body.

15. A tray mounted on an electronic device, the tray comprising:
    a tray body to accommodate an external storage medium;
    a lever assembly comprising:

a first lever comprising a first rotation axis hole, and a first rotation axis pin to pass through a first portion of the tray body and the first rotation axis hole, the lever assembly being arranged for a rotation axis to be fixed to the tray body by the first rotation axis pin; and a tray head coupled to the lever assembly to be movable with respect to the rotation axis, wherein the tray body comprises a pair of supports protruding in a direction toward the tray head, each support of the pair of supports includes a coupling hole at a free end of the support, and wherein each support of the pair of supports is differently offset from a long edge of the tray body closest to the tray head.

16. The tray of claim 15, wherein the rotation axis of the lever assembly is located at a position corresponding to the coupling hole.

17. The tray of claim 15, wherein the first lever comprises a first coupling hole disposed at one end of the first lever, and wherein the lever assembly comprises:

a second lever comprising a second rotation axis hole and a second coupling hole disposed at one end of the second lever, a coupling pin to pass through the first coupling hole and the second coupling hole so that one end of the first lever and one end of the second lever at least partially overlap, a first rotation axis pin to pass through a second portion of the tray body and the first rotation axis hole, and a second rotation axis pin to pass through a third portion of the tray body and the second rotation axis hole.

18. The tray of claim 15, wherein the tray head comprises a receiving space for accommodating a portion of the lever assembly and another portion of the tray body.

19. The tray of claim 15, wherein the lever assembly is arranged in between the tray body and the tray head so as to indirectly couple the tray body and the tray head.

20. The tray of claim 17, wherein the tray is configured to draw out the tray head by rotating the other end of the first lever away from the coupling pin and the other end of the second lever away from the coupling pin to push a front surface of the tray head.

* * * * *